US011959377B2

(12) United States Patent
Steel et al.

(10) Patent No.: US 11,959,377 B2
(45) Date of Patent: Apr. 16, 2024

(54) SYSTEMS AND METHODS FOR ANALYZING CASING BONDING IN A WELL USING RADIAL SENSING

(71) Applicants: Pipelines 2 Data (P2D) Limited, Aberdeen (GB); ConocoPhillips Company, Houston, TX (US)

(72) Inventors: Geoff Steel, Aberdeen (GB); Mark Walsh, Aberdeen (GB); Stephen John Mayo, Aberdeen (GB)

(73) Assignees: CONOCOPHILLIPS COMPANY, Houston, TX (US); PIPELINES 2 DATA (P2D) LIMITED

( * ) Notice: Subject to any disclaimer, the term of this patent is extended or adjusted under 35 U.S.C. 154(b) by 367 days.

(21) Appl. No.: 17/080,216

(22) Filed: Oct. 26, 2020

(65) Prior Publication Data

US 2021/0123339 A1   Apr. 29, 2021

Related U.S. Application Data

(60) Provisional application No. 62/926,243, filed on Oct. 25, 2019, provisional application No. 62/926,228, (Continued)

(51) Int. Cl.
*E21B 47/005* (2012.01)
*E21B 33/134* (2006.01)
(Continued)

(52) U.S. Cl.
CPC .......... *E21B 47/005* (2020.05); *E21B 33/134* (2013.01); *G01V 1/46* (2013.01);
(Continued)

(58) Field of Classification Search
CPC .... E21B 47/005; E21B 33/134; E21B 47/107; G01V 1/46; G01V 1/50; G01V 2200/10; G01V 2210/48; G10L 25/18; G10L 25/51
See application file for complete search history.

(56) References Cited

U.S. PATENT DOCUMENTS

| 4,658,383 A | 4/1987 | Zimmer |
| 4,992,994 A * | 2/1991 | Rambow ............... G01V 1/46 |
| | | 181/102 |

(Continued)

FOREIGN PATENT DOCUMENTS

| CA | 3063567 A1 | 6/2020 |
| WO | WO-2017210231 A1 | 12/2017 |

(Continued)

OTHER PUBLICATIONS

International Search Report and Written Opinion for International Application No. PCT/US2020/057334 dated Feb. 5, 2021, 8 pages.

(Continued)

*Primary Examiner* — Ryan W Sherwin
(74) *Attorney, Agent, or Firm* — Polsinelli PC

(57) ABSTRACT

Implementations described and claimed herein provide systems and methods for isolation detection. In one implementation, recorded data is obtained. The recorded data includes radial acoustic waves transmitted and received using a radial sensor of an acoustic logging tool deployed in a wellbore. Clockwise waves are separated from counterclockwise waves by converting the recorded data from a time domain to a frequency domain. The clockwise waves are shifted into shifted clockwise waves, and the counterclockwise waves are shifted into a shifted counterclockwise waves. A forward wave is generated by combining the shifted clockwise waves, and a reflected wave is generated by combining the shifted counterclockwise waves. One or more isolation regions are identified in the wellbore using the forward wave and the reflected wave.

22 Claims, 20 Drawing Sheets

US 11,959,377 B2
Page 2

Related U.S. Application Data filed on Oct. 25, 2019, provisional application No. 63/032,240, filed on May 29, 2020, provisional application No. 63/094,258, filed on Oct. 20, 2020.

(51) Int. Cl.

| | |
|---|---|
| *G01V 1/46* | (2006.01) |
| *G01V 1/50* | (2006.01) |
| *G10L 25/18* | (2013.01) |
| *G10L 25/51* | (2013.01) |

(52) U.S. Cl.
CPC .............. *G01V 1/50* (2013.01); *G10L 25/18* (2013.01); *G10L 25/51* (2013.01); *G01V 2200/10* (2013.01); *G01V 2210/48* (2013.01)

(56) References Cited

U.S. PATENT DOCUMENTS

| | | | |
|---|---|---|---|
| 6,941,819 B1 | 9/2005 | Maki, Jr. et al. | |
| 9,494,705 B2 | 11/2016 | Sinha | |
| 10,222,501 B2 | 3/2019 | Zhang et al. | |
| 10,465,509 B2 | 11/2019 | Yao et al. | |
| 11,542,810 B2 | 1/2023 | Hallundbæk et al. | |
| 2003/0151975 A1 | 8/2003 | Zhou et al. | |
| 2004/0001389 A1 | 1/2004 | Tang | |
| 2004/0216873 A1 | 11/2004 | Frost et al. | |
| 2005/0205248 A1 | 9/2005 | Barolak et al. | |
| 2006/0119364 A1 | 6/2006 | Chen et al. | |
| 2010/0038079 A1 | 2/2010 | Greenaway | |
| 2010/0154531 A1 | 6/2010 | Han et al. | |
| 2011/0188347 A1 | 8/2011 | Thiercelin et al. | |
| 2011/0255370 A1 | 10/2011 | Hirabayashi et al. | |
| 2013/0098604 A1 | 4/2013 | Ramakrishnan et al. | |
| 2014/0177389 A1 | 6/2014 | Bolshakov et al. | |
| 2015/0198732 A1 | 7/2015 | Zeroug et al. | |
| 2015/0285607 A1 | 10/2015 | Helmore | |
| 2016/0109614 A1 | 4/2016 | Wu et al. | |
| 2016/0299050 A1 | 10/2016 | Dorovsky et al. | |
| 2017/0016305 A1 | 1/2017 | Prieur et al. | |
| 2017/0114626 A1* | 4/2017 | Bardapurkar | E21B 47/005 |
| 2018/0003032 A1 | 1/2018 | Donzier et al. | |
| 2018/0031723 A1 | 2/2018 | Przebindowska et al. | |
| 2018/0073353 A1 | 3/2018 | Malik et al. | |
| 2018/0100950 A1 | 4/2018 | Yao et al. | |
| 2018/0149019 A1 | 5/2018 | Bose et al. | |
| 2018/0196157 A1 | 7/2018 | Zeroug et al. | |
| 2019/0101663 A1* | 4/2019 | Walters | G01V 1/52 |
| 2019/0226319 A1 | 7/2019 | Espe et al. | |
| 2020/0049850 A1 | 2/2020 | Liu et al. | |
| 2020/0072996 A1 | 3/2020 | Zhao et al. | |
| 2021/0054728 A1 | 2/2021 | Fellinghaug et al. | |
| 2021/0364477 A1 | 11/2021 | Shoji et al. | |

FOREIGN PATENT DOCUMENTS

| | | |
|---|---|---|
| WO | WO-2018176024 A1 | 9/2018 |
| WO | WO-2018183246 A1 | 10/2018 |
| WO | WO-2019118189 A1 | 6/2019 |

OTHER PUBLICATIONS

International Search Report and Written Opinion for International Application No. PCT/US2020/057344 dated Jan. 26, 2021, 14 pages.

International Search Report and Written Opinion for International Application No. PCT/US2020/057415 dated Jan. 27, 2021, 8 pages.

International Search Report and Written Opinion for International Application No. PCT/US2020/057418 dated Jan. 26, 2021, 11 pages.

Oct. 17, 2022—U.S. Final Office Action—U.S. Appl. No. 17/080,155, 32 Pages.

Nov. 25, 2022—U.S. Non-Final Office Action—U.S. Appl. No. 17/080,763, 30 Pages.

Feb. 15, 2023 U.S. Non-Final Office Action—U.S. Appl. No. 17/080,761, 6 Pages.

Apr. 6, 2023—U.S. Final Office Action—U.S. Appl. No. 17/080,763, 30 Pages.

Mar. 17, 2023—U.S. Non-Final Office Action—U.S. Appl. No. 17/080,155, 44 Pages.

Aug. 1, 2023—U.S. Non-Final Office Action—U.S. Appl. No. 17/080,763, 34 Pages.

Aug. 2, 2023—U.S. Notice of Allowance—U.S. Appl. No. 17/080,761, 11 Pages.

Sep. 2, 2023—U.S. Final Office Action—U.S. Appl. No. 17/080,155, 52 Pages.

Extended European Search Report for Application No. 20878482.7 dated Oct. 17, 2023 (12 pages).

Supplementary European Search Report for Application No. EP 20 87 9562 dated Nov. 7, 2023 (8 pages).

Supplementary European Search Report for Application No. EP 20 87 9978 dated Nov. 9, 2023 (9 pages).

* cited by examiner

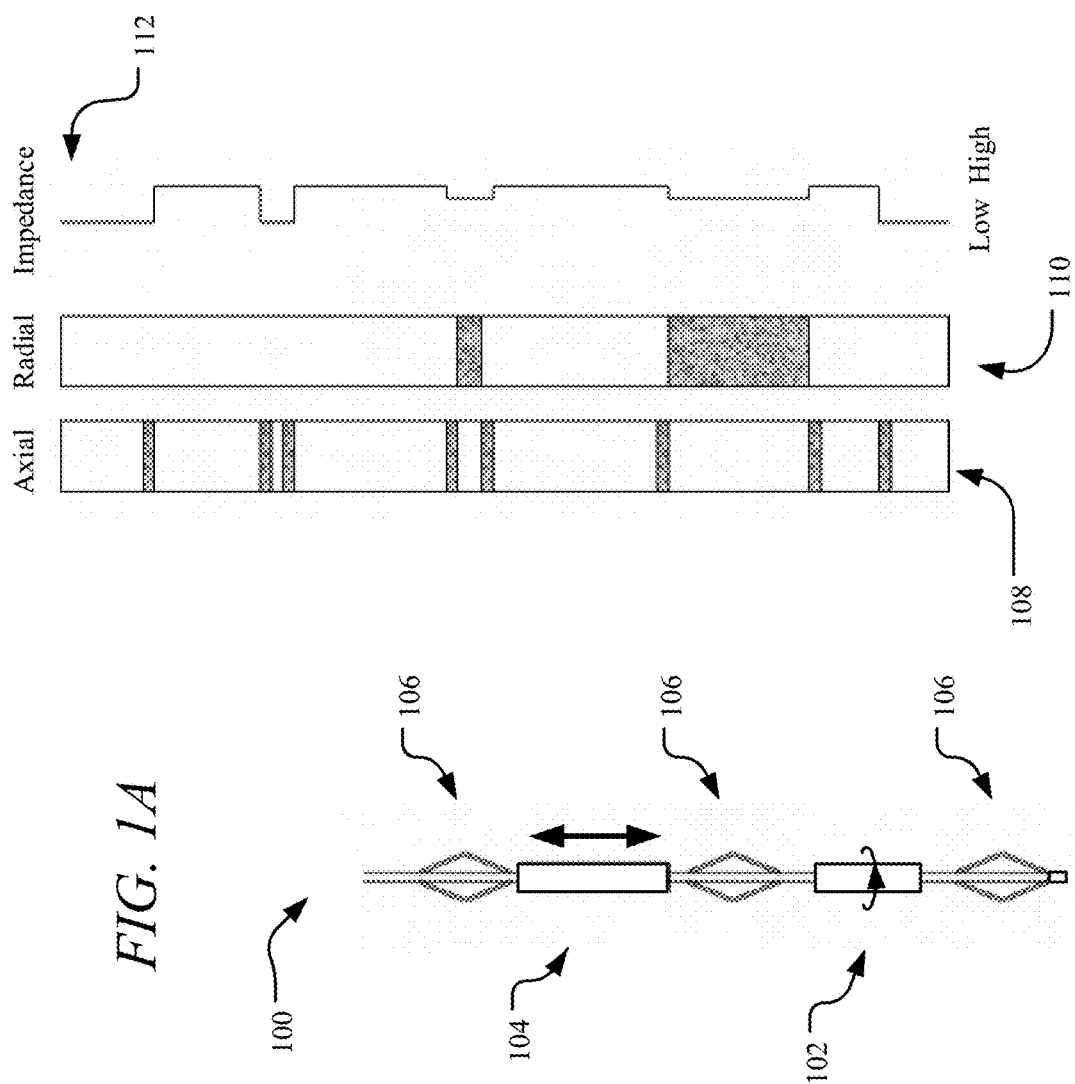

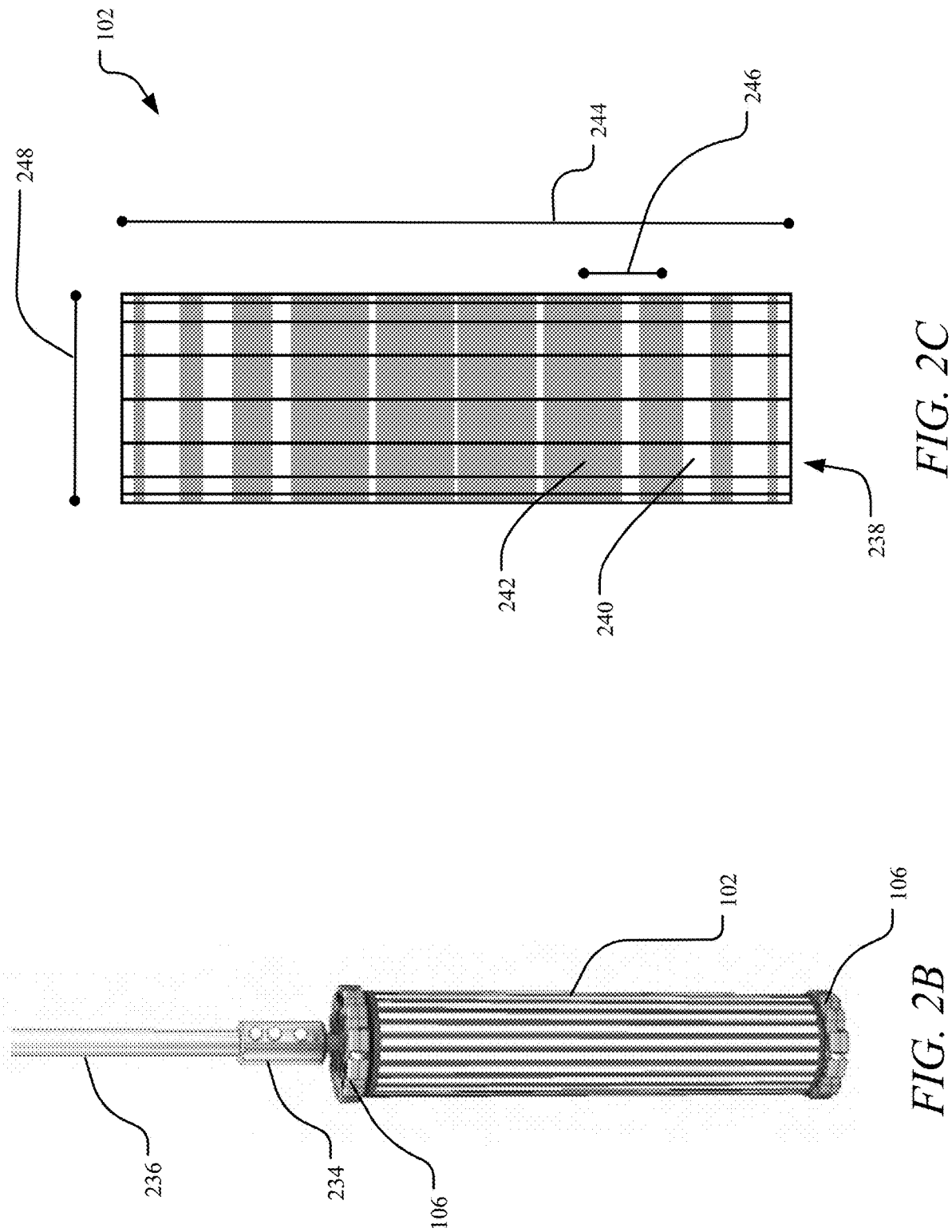

SYSTEMS AND METHODS FOR ANALYZING CASING BONDING IN A WELL USING RADIAL SENSING

CROSS-REFERENCE TO RELATED APPLICATIONS

The present application claims priority to U.S. Provisional Application No. 63/094,258 filed Oct. 20, 2020 and U.S. Provisional Application No. 62/926,243 filed Oct. 25, 2019 and U.S. Provisional Application No. 62/926,228 filed Oct. 25, 2019 and U.S. Provisional Application No. 63/032,240 filed May 29, 2020. Each of these applications is incorporated by reference in its entirety herein.

BACKGROUND

I. Field

Aspects of the present disclosure relate generally to systems and methods for analyzing subterranean cylindrical structures using acoustic sensing and more particularly to identifying isolation in connection with wellbore plug and abandon techniques.

II. Discussion of Related Art

Production of hydrocarbons involves forming one or more wells in a subterranean formation. Generally, in connection with formation of a well, a wellbore is drilled and a casing is passed down the wellbore. The casing often includes sections with differing diameters, eccentricities, and/or bonding with surrounding material. In some regions, there may be concentric casing. In many instances, a casing or outer casing forms an annular space with surrounding rock. The annular space is commonly filled with cement or a similar material over at least part of its length when the well is created. Production tubing is passed through the casing, and the hydrocarbons are produced through the production tubing. In this context, the casing supports the wellbore and prevents collapse of the well.

Wellbores may be plugged and abandoned at the end of the wellbore useful life to prevent environmental contamination, among other benefits. At the end of the useful life, a wellbore commonly includes cemented casing with the production tube passed down the casing. In connection with plug and abandon, an effective seal is created across a full diameter of the wellbore. Conventionally, production tubing is removed and casing is milled away, along with cement exterior to the casing, before setting a continuous new cement plug across the full diameter of the wellbore, from rock to rock. Alternatively, the casing can be left in place, provided that the quality of original cement and cement bond to the exterior of the casing are confirmed. If the cement and cement bond to the exterior of the casing is adequate, a new cement plug can be set inside the casing, thereby effectively creating a barrier across the full diameter of the wellbore.

Thousands of meters of production tubing are typically removed to identify isolation corresponding to regions of cement having seal integrity suitable for plug and abandon. Stated differently, identifying one or more locations of isolation provided by exterior cement during plug and abandon activities conventionally involves removal of internal completion to permit logging tools free access to casings. Through-tubing plug and abandonment may theoretically be performed without removing the production tubing, saving considerable expense. The tubing may simply be cut or perforated and cement passed down the tubing and back up the annulus between tubing and casing to form a plug across the full casing diameter. However, this would involve assessment of the cement bond with casing from a location within the production tubing, and conventional techniques are unable to detect an integrity of a cement bond with a casing through the production tubing, casing, and any material, such as water, air, and/or gas. Isolation detection is thus time and resource extensive. It is with these observations in mind, among others, that various aspects of the present disclosure were conceived and developed.

SUMMARY

Implementations described and claimed herein address the foregoing problems by providing systems and methods for characterizing a subterranean structure. In one implementation, recorded data is obtained. The recorded data includes radial acoustic waves transmitted and received using a radial sensor of an acoustic logging tool deployed in a wellbore. A first set of waves of the radial acoustic waves is separated from a second set of waves of the radial acoustic waves by converting the recorded data from a time domain to a frequency domain. The first set of waves correspond to a first direction of radial propagation, and the second set of waves correspond to a second direction of radial propagation. The first set of waves is shifted into a first set of shifted waves, and the second set of waves is shifted into a second set of shifted waves. A forward wave is generated by combining the first set of shifted waves, and a reflected wave is generated by combining the second set of shifted waves. One or more isolation regions are identified in the wellbore using the forward wave and the reflected wave.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 1A illustrates an example acoustic logging tool of an isolation detection system for characterizing a subterranean structure.

FIGS. 1B and 1C depict acoustic data captured using the acoustic logging tool and a characterization of isolation of the subterranean structure.

FIGS. 2B-2C each illustrate an example radial sensor with multiple staves.

DETAILED DESCRIPTION

Figure 2A:
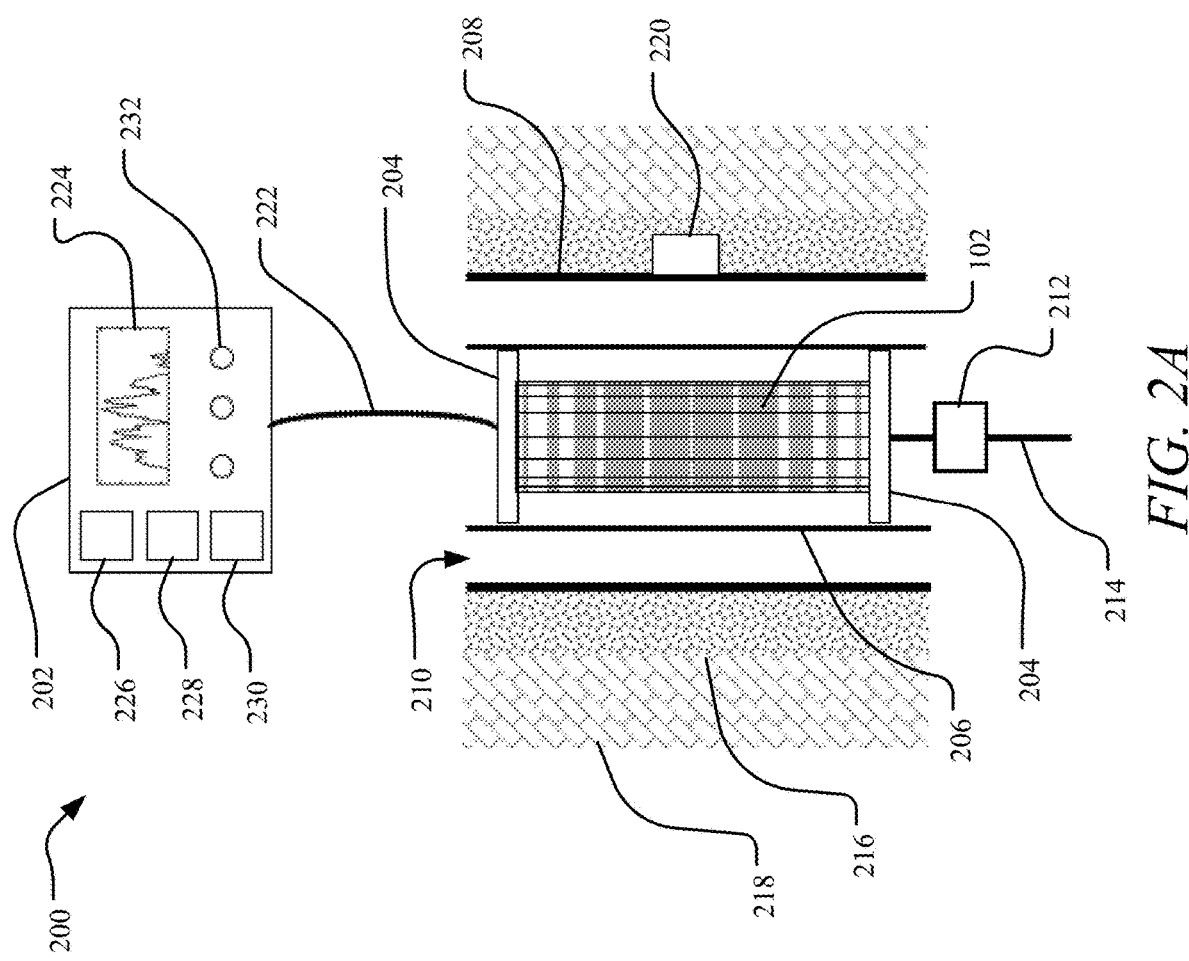
FIG. 2A shows an example radial sensor of the acoustic logging tool deployed in an example downhole environment.

Aspects of the present disclosure involve systems and methods for analyzing a structure, such as a cylindrical structure and/or a subterranean structure, using acoustic waves. In one aspect, an acoustic logging tool having one or more acoustic sensors is deployed in a production tube to detect cement integrity around a casing in a downhole environment of a wellbore. The one or more acoustic sensors may include an axial sensor and/or a radial sensor. The radial sensor located inside the production tube generates a forward Rayleigh wave traveling around an outer surface of the casing. The wave is reflected from any asymmetries, such as in cement surrounding the casing and/or in the cement bonding with the casing. For example, an air gap adjacent the casing may reflect the wave. By analyzing spectral information from the forward and reflected waves, isolation region(s) may be identified. The isolation region(s) correspond to regions in the wellbore where bonded cement is free from anomalies and suitable for plug and abandon. Accordingly, the radial sensor provides isolation detection through both the production tube and the casing, without removal of internal completion, thereby reducing the time and resources expended for plug and abandon operations, among other advantages.

I. Terminology

In the description, phraseology and terminology are employed for the purpose of description and should not be regarded as limiting. For example, the use of a singular term, such as "a", is not intended as limiting of the number of items. Also, the use of relational terms are used in the description for clarity in specific reference to the figure and are not intended to limit the scope of the present inventive concept or the appended claims. Further, any one of the features of the present inventive concept may be used separately or in combination with any other feature. For example, references to the term "implementation" means that the feature or features being referred to are included in at least one aspect of the presently disclosed technology. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the presently disclosed technology may include a variety of combinations and/or integrations of the implementations described herein. Additionally, all aspects of the presently disclosed technology as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

To begin a detailed discussion of an example isolation detection system for characterizing a subterranean structure, reference is made to FIGS. 1A-1C. In one implementation, an acoustic logging tool 100 including one or more acoustic sensors is deployed into the subterranean structure. Examples of the various systems and methods described herein reference the subterranean structure including a production tube and casing in connection with isolation detection for plug and abandon operations. However, it will be appreciated by those skilled in the art that the presently disclosed technology is applicable to various types of structures, systems, and operations, including outside the oil and gas context. For example, the acoustic logging tool 100 may be used to determine a condition of pipes in connection with pigging operations in the oil and gas industry, the water industry, and/or the like. As another example, the acoustic logging tool 100 may be used in oil and gas applications to inspect structures deployed outside of downhole environments. Additionally, the acoustic logging tool 100 may be used to inspect fabricated pipes, storage tanks, and/or cylindrical structures to determine an integrity of structure containment and/or identify materials and connections outside and/or inside the structures.

As can be understood from FIG. 1A, in one implementation, the acoustic logging tool 100 includes a radial sensor 102, an axial sensor 104, and one or more centralizers 106. The centralizers 106 may be positioned above and below the acoustic sensors 102-104 to maintain the acoustic logging tool 100 in a centralized coaxial position inside a length of production tubing, which is vertically oriented and located coaxially within a length of casing. The casing or an outer casing forms an annular space with a surrounding subterranean formation of a well. The annular space may be filled with cement or a similar material over at least part of its length when the well is created, and upon filling, the cement is intended to bond with the casing or outer casing to provide a seal.

In one implementation, the radial sensor 102 and the axial sensor 104 are independent sensors operating in orthogonal directions. The radial sensor 102 confirms a presence of radial symmetry in an isolation region, and the axial sensor 104 confirms a presence of axial symmetry in the isolation region. The axial sensor 104 scans in an axial direction along a length of the production tube, while the radial sensor 102 scans in a radial direction that is orthogonal to a general axis of the length of the production tube. As such, the axial sensor 104 detects changes in waves traveling along the casing reflected from anomalies in the materials beyond the casing, as well as changes in the production tube and casing collars, while the radial sensor 102 detects changes in waves travelling around the casing reflected from anomalies in the materials beyond the casing. Thus, referring to FIGS. 1B-1C, an axial log 108 is captured using the axial sensor 104 and a radial log 110 is captured using the radial sensor 102. In some implementations, each of the radial sensor 102 and the axial sensor 104 may capture both the axial log 108 and the radial log 110. The acoustic sensors 102-104, alone or together, provide an approximate measure of acoustic impedance 112 of the material surrounding the casing, which may be used in cement classification. Combining the axial log 108, the radial log 110, and the acoustic impedance 112, a characterization of isolation 114 may be generated. As shown in the characterization of isolation 114, isolation occurs when the axial log 108 includes an axial symmetry, the radial log 110 includes a radial symmetry, and the acoustic impedance 112 is high.

Generally, the axial sensor 104 senses short, thick features or anomalies on the casing, while the radial sensor 102 senses long, thin features or anomalies on the casing. The axial sensor 104 and the radial sensor 102, alone or in combination, may be used to determine whether material in contact with the casing is cement or another material. Stated differently, both the radial sensor 102 and the axial sensor 104 may detect axial symmetry and radial symmetry and classify a material in contact with the casing in terms acoustic impedance.

In one implementation, the acoustic logging tool 100 is deployed along the length of the production tube as the radial sensor 102 and/or the axial sensor 104 scans. Using the axial log 108 acquired from the scans, a determination may be made regarding whether there is axial symmetry, such that the material in contact with the casing is homogeneous. Similarly, using the radial log 110 acquired from the scans, a determination may be made regarding whether there is radial symmetry, such that the material in contact with the casing is homogeneous in a radial plane. Thus, based on the axial symmetry and/or the radial symmetry, there is confirmation that for the length of travel of the acoustic logging tool 100 along the production tube during the scan, the material in contact with the casing is axially and/or radially the same. Accordingly, the material is free from anomalies, whether short and thick or long and thin, and isolation is present. In other words, the acoustic logging tool 100 senses whether the material surrounding the casing is bonded with the casing around an entirety of the casing. Additionally, the acoustic logging tool 100 may be used to identify the material surrounding the casing. For example, the material may be cement, a fluid, a gas, and/or the like.

In some instances, reliance on the axial log 108 alone may result in a false isolation determination. For example, a channel in the material around the casing may be axially symmetrical. In this case, the axial log 108 suggests that the material surrounding the casing is axially symmetric and thus, isolation is present, but there would not be isolation in this case due to the presence of the channel. On the other hand, as the radial sensor 102 detects anomalies in the radial direction, the radial log 110 would identify radial asymmetries due to the presence of the channel. Therefore, the radial sensor 102 may be used to supplement or in place of the axial sensor 104 to detect isolation with a higher level of confidence. Indeed, the radial sensor 102 in general is more sensitive than the axial sensor 104.

In one example implementation, the acoustic logging tool 100 is deployed to evaluate isolation between the casing and subterranean formation, such as bedrock, around a hole from inside the production tube. The casing may be approximately nine to ten inches in diameter, with the hole being approximately sixteen inches and the production tubing being approximately four inches in diameter. The acoustic logging tool 100 provides 360° of coverage sufficient to identify anomalies that are of approximately one inch of diameter or greater at the casing-cement/barrier interface. As described here, the acoustic logging tool 100 discriminates between a vertically continuous anomaly and a vertically discontinuous anomaly, as well as between different types of materials, such as liquid (gas, seawater, brine, water-based mud, oil-based mud, etc.) and solid (e.g., cement, creeping shale, salt, etc.). The acoustic logging tool 100 tolerates the casing and/or the production tube being non-concentric, such that isolation detection may be provided despite the presence of eccentricity. Additionally, the acoustic logging tool 100 is able to cope with variable tubing conditions, such as the presence of oil, scale, corrosion, and/or the like. In addition to the logging capabilities of the acoustic logging tool 100, the physical features provide that the acoustic logging tool 100 may be run on a wireline, fit through a small (e.g., 3.5 inch diameter) restriction, and operate in an environment of approximately 9,000 PSI with a wellbore temperate of approximately 150° C. and in various inclinations due to mechanical deployment downhole.

As discussed above, the acoustic logging tool 100 tolerates eccentricity using the radial sensor 102. Downhole, the production tube is often eccentric with the casing. The radial log 110 may be sensitive to the production tube eccentricity. For example, production tube eccentricity may be detected by convolution, which obtains data from a particular point and generates a reverse dataset. The dataset from the particular point and the reverse dataset are multiplied together and summed to generate a value. The multiplication and summation of the two datasets is repeated by sliding the data and plotting the numbers through shifting, multiplying, and integration to extract axes of symmetry. Accordingly, the radial sensor 102 is capable of detecting isolation, even in the presence of eccentricity.

Turning to FIGS. 2A-2B, the radial sensor 102 may be deployed in a downhole environment 200. As shown in FIG. 2A, in one implementation, a controller 202 obtains data from the radial sensor 102 in the downhole environment 200. The radial sensor 102 may record signals using a recorder integrated with the acoustic logging tool 100 and/or transmit the signals up wires for recording at the surface. Once the data is recorded, the controller 202 obtains the data for processing.

In one implementation, the radial sensor 102 includes a body, which may be cylindrical in shape and made from electrically insulating material with staves arranged on an outer surface of the body. The radial sensor 102 may be maintained in a centralized, coaxial position inside a length of a production tube 206 using one or more spacers 204, which may be the centralizers 106. The spacers 204 may be made from electrically insulating material and disposed at a proximal end and a distal end of the radial sensor 102. The production tube 206 may be made from steel or a similar metal and is vertically oriented and disposed coaxially within a length of casing 208. The casing 208 may similarly made from steel and/or the like. Between the casing 208 and the production tube 206 is an annular gap 210, which may be filled with water. Surrounding the casing 208 is a layer of cement 216, which is further surrounded by a subterranean formation 218. The subterranean formation 218 may include various types of rocks disposed about the wellbore. In some cases, an anomaly 220 may be present in the cement 216, such that there is no isolation at the region including the anomaly 220.

The radial sensor 102 is movable axially within the production tube 206. In one implementation, the radial sensor 102 is connected at the distal end to a shaft 214 that is engaged to an advancing system 212 having a motor to advance and retract the radial sensor 102 downhole. It will be appreciated, however, that the radial sensor 102 may be translated along a length of the production tube 206 in various manners.

As described in more detail herein, the controller 202 obtains data captured using the acoustic logging tool 100, including the radial sensor 102, and processes the recorded data. The radial sensor 102 transmits waves at a known angular velocity and captures the waves at the same angular velocity. The radial sensor 102 may record the captured signal or transmit the signal to a computing device, such as the controller 202, at the surface for recording. In either case, the controller 202 may obtain the recorded data that is captured using the radial sensor 102 directly or indirectly. The recorded data may be communicated to the controller 202 from the radial sensor 102 or via another computing device and/or data storage device using a wireless connection (e.g., for communication over a network) or a wired connection (e.g., wired connection 222).

In some implementations, the controller 202 or another computing device may include a display 224, at least one power source 226, at least one processor 228, a signal generator 230, controls 232, and/or the like for controlling the radial sensor 102, recording signal data, displaying signal data, and/or processing the signal data as described herein. The controller 202 may be present on-site or remote from the downhole environment 200. It will further be appreciated that the same or separate computing devices may be used to control the radial sensor 102 in connection with capturing and recording signals and to process the captured signals. The example implementations described herein will reference the controller 202 in connection with processing the recorded signals. However, this reference is for discussion purposes only and is not intended to be limiting.

Referring to FIGS. 2B-2C, the radial sensor 102 may be mounted to a bar 236 (e.g., a made from ploy(methyl methacrylate, acrylic, acrylic glass, etc.) using a coupling 234 and disposed between the centralizers 106 and translated within the production tube 206. Generally, the radial sensor 102 is sensitive to waves traveling around the production tube 206 and the casing 208 but not to waves traveling axially along the lengths of the production tube 206 and the casing 208. In one implementation, the radial sensor 102 includes a plurality of staves 238 disposed about the body of the radial sensor 102. The example implementations discussed herein reference the staves 238 including sixteen staves. However, it will be appreciated that any number of the staves 238 may be used for spatial sampling depending on a size of the radial sensor 102, the production tube 206, the casing 208, and/or the like.

In one implementation, the radial sensor 102 includes a plurality of plates 242 arranged on a backing 240. The backing 240 may be made from a high-impedance material, such as an epoxy-tungsten mix. Each of the plates 242 is a sensitive plate configured to transmit and receive signals. While separate plates may be used for transmitting and receiving, utilizing the plates 242 for both transmitting and receiving reduces an overall size of the radial sensor 102, thereby conserving resources and increasing mobility while maintaining sensitivity. As can be understood from FIGS. 2B-2C, each of the staves 238 extends along a longitudinal line formed by a plurality of the plates 242 (e.g., ten plates) wired in parallel and operating at frequencies well below resonance. The plates 242 taper in size longitudinally along a length of the radial sensor 102, such that the plates 242 are longer in a middle of the radial sensor 102 and shorter at ends of the radial sensor 102. This tapering configuration of the plates 242 forms a truncated hanning window to minimize longitudinal sensitivity of the radial sensor 102. Stated differently, the tapering configuration provides that the radial sensor 102 is sensitive to waves traveling around the production tube 206 and the casing 208 but not to waves traveling axially along the lengths of the production tube 206 and the casing 208. Dimensions of the plates 242 may vary based on the hanning window or other weighting function utilized to form the tapering configuration. For example, each of the plates 242 may be approximately 2 mm thick, 10 mm wide, and include a spacing 246 from a center of one plate to another plate of approximately 44 mm. The radial sensor 102 may have a width 248 of approximately 86 mm, a length 244 of approximately 420 mm, and the bar 236 may be approximately 25 mm wide in this example.

Each of the staves 238 acts as both a transmitter and receiver. In one implementation, the radial sensor 102 transmits on one of the staves 238 at a time, while receiving each time at all the staves 238. Stated differently, a first stave of the staves 238 is pinged and transmits a first signal, which is recorded on each of the staves 238. Then a second stave of the staves 238 is pinged and transmits a second signal, which is recorded on each of the staves 238. Each of the staves 238 transmits in turn while all the staves 238 record.

In one implementation, with each of the staves 238 both transmitting and receiving, the radial sensor 102 includes transmit and receive switches on a chip for each of the staves 238. The switches may be linear analogue switches configured to generate chirp pulses. While high-voltage switches may be used, such switches generate square waves, which may excite the plates 242 at their resonant frequency, thereby involving high-speed sampling and additional dynamic range. The linear analogue switches provide close control of amplitude and bandwidth in the chirp pulses. In one implementation, a pair of linear analogue switches are utilized. During transmission, both the first and second switches are closed, such that the inhibit lines go low and current flows through the first switch to the plates 242 and a capacitor which are arranged in parallel. No voltage appears at an amplifier input because it is shorted to ground via the second switch. After transmission, both the first and second switches are open, such that inhibit goes high and received signals from the plates 242 flow through the capacitor, which is now in series, to the amplifier input. Address lines on each of the chips facilitate selection of a transmission channel for each of the staves 238 with only one of the staves 238 acting as a transmitter at a time and each of the staves 238 acting as a receiver each time. The receive amplifier has a gain of approximately +30 dB.

As described above, the linear analogue switches of the staves 238 transmit a chirp pulse or other waveform covering a wide bandwidth. The transmitted waveform of the chirp pulse may be approximately 300 μs from approximately 8 to 28 kHz. In one implementation, the chirp has a slightly asymmetrical envelope providing zero DC offset to ensure that the plates 242 and the parallel capacitor have no charge after transmission, thereby avoiding a transient with the switches are open. The chirp may have an amplitude of approximately +/−8V or other voltage for overcoming any frictional noise generated by the centralizers 106 as the radial sensor 102 is translated within the production tube 206 with continuous movement.

Figure 3:
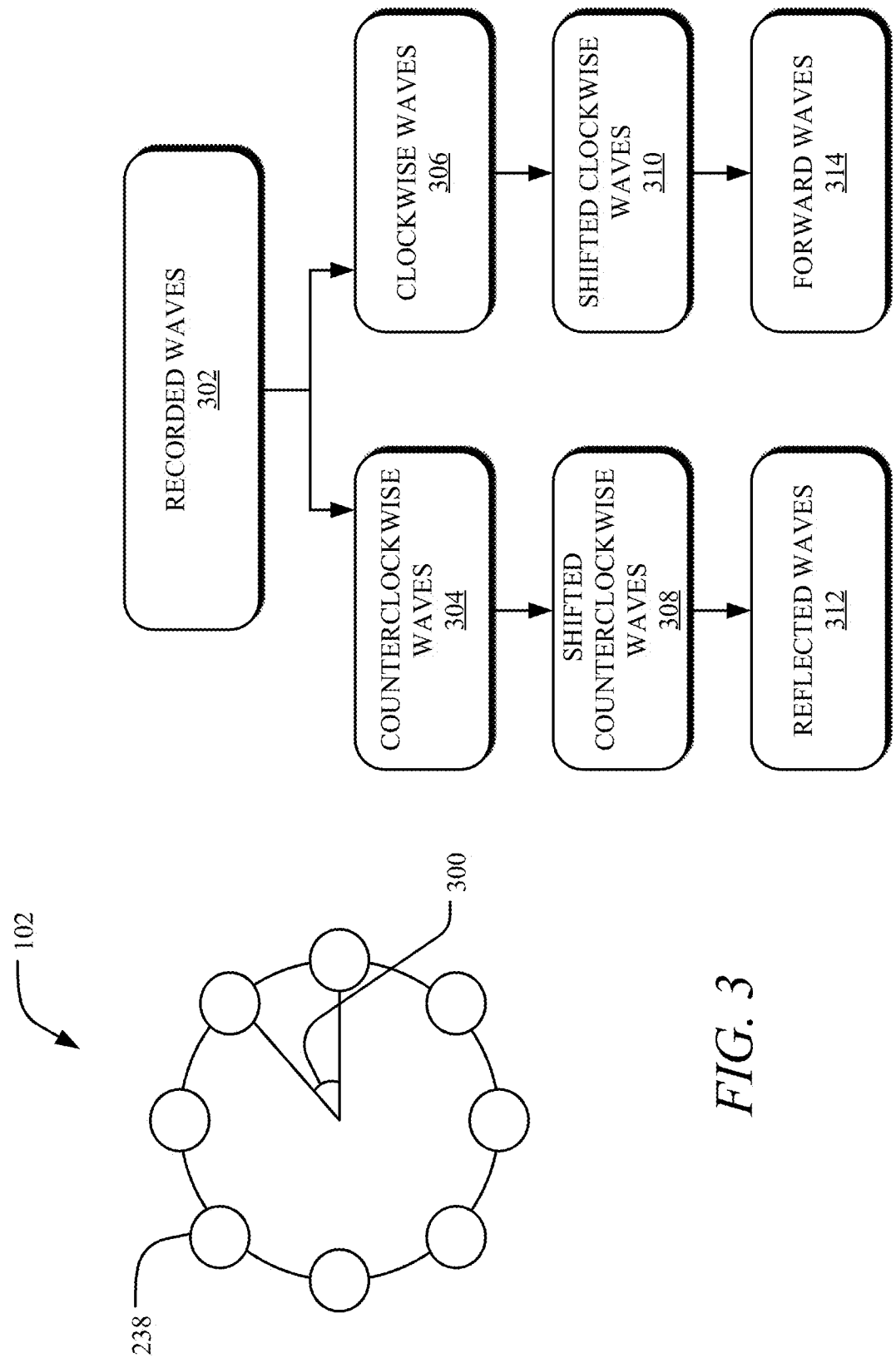
FIG. 3 shows an example radial endfire sensing configuration of the isolation detection system.

Referring to FIG. 3, an example radial endfire sensing configuration is illustrated. In one implementation, the staves 238 are disposed about an axis of the radial sensor 102 with equidistant spacing. For example, the staves 238 may each be space from each other by an angle 300. When a wave is transmitted by one of the staves 238, the wave travels around the casing 208 in a first direction (e.g., clockwise). When the anomaly 220, such as a channel, is not present in the cement 126, the wave will continue to travel around the casing 208 without interruption. When the anomaly 220 is present, the anomaly 220 reflects the wave in a second direction, such as counterclockwise. Accordingly, as described in more detail herein, the radial sensor 102 identifies the anomaly 220 based on the reflected wave.

As will be understood by those skilled in the art and described in more detail herein, waves are not transmitted or received directly. Instead, the waves are reconstructed from data recorded from the signals received by the staves 238. As illustrated in FIG. 3, recorded waves 302 are obtained from signals captured by the staves 238. The recorded waves 302 are traveling in both the first direction and the second direction. In the example of FIG. 3, the first direction is clockwise and the second direction is counterclockwise. Because the recorded waves 302 are traveling in both directions, the recorded waves 302 are separated into counterclockwise waves 304 and clockwise waves 306. The counterclockwise waves 304 are shifted into shifted counterclockwise waves 308, and the clockwise waves 306 are shifted into shifted clockwise waves 310. The counterclockwise waves 304 and the clockwise waves 306 are shifted based on the angle 300. For example, the angle 300 may be defined as θ, and the waves are shifted in angle: 0, −θ, −2θ, etc., such that multiplication in the frequency domain is by $e^{i0}$, $e^{ik\theta}$, $e^{2ik\theta}$, etc. The shifted counterclockwise waves 308 are added to together to form reflected waves 312, and the shifted clockwise waves 310 are added together to form forward waves 314. As described in more detail herein, the reflected waves 312 may be used to detect the anomaly 220. As will be appreciated, a time delay method and/or a reconstruction method may be utilized in connection with radial sensing.

Figures 4A, 4B:
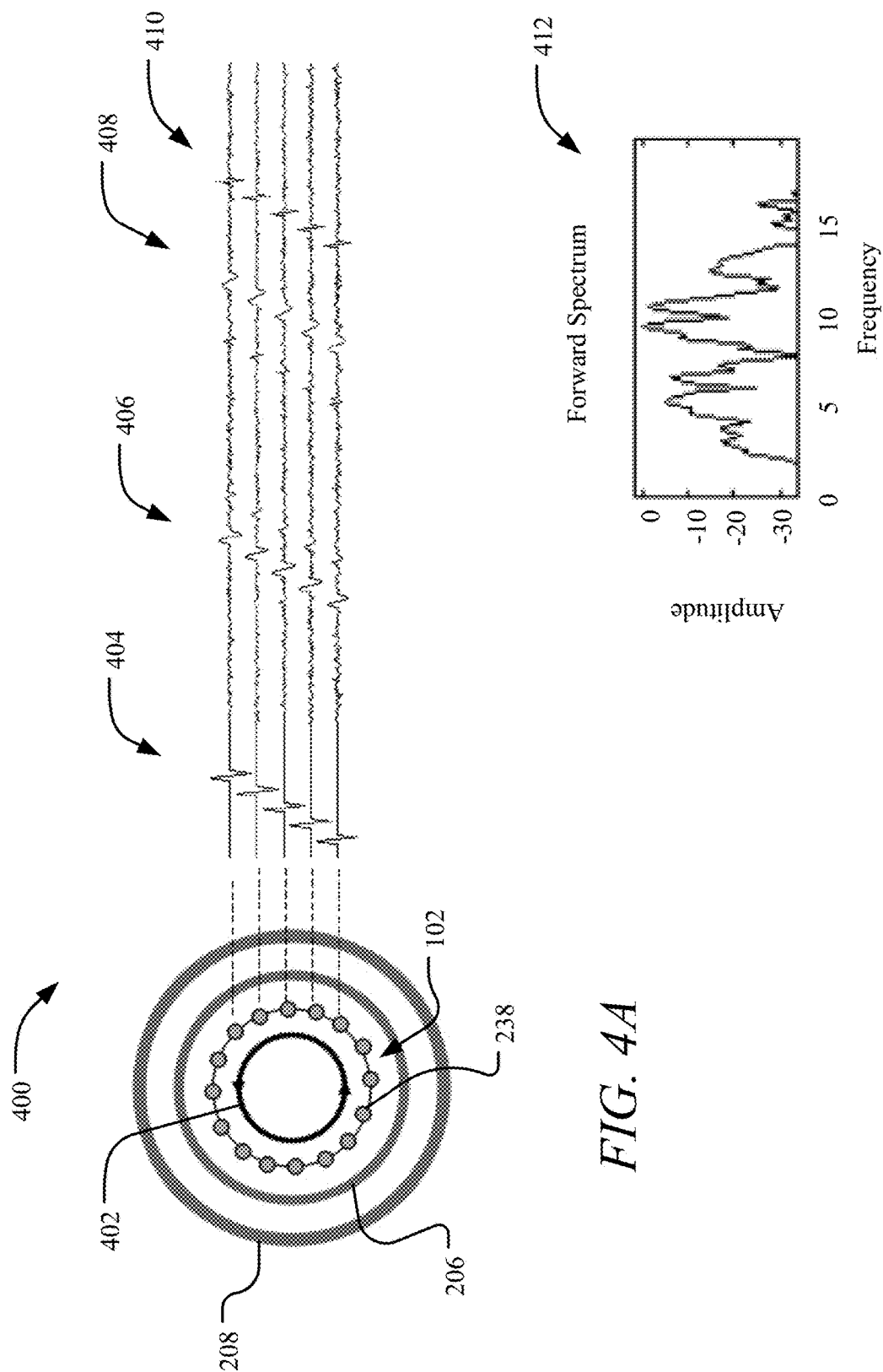
FIG. 4A is a cross sectional view of the radial sensor deployed in a well from which radial acoustic signals are received and processed.
FIG. 4B illustrates a plot of a forward spectrum of the radial acoustic signals of FIG. 4A.

To begin a detailed discussion of a time delay method for radial sensing, reference is made to FIGS. 4A-4B, which illustrate a representation 400 of radial sensing in the absence of a target. FIG. 4A shows a representation of a timing sequence of part of a transmit and receive sequence. In one implementation, a forward wave 402 is transmitted with time delays to define an angular velocity. More particularly, a pulse, such as a chirp pulse is emitted from each stave 238 and received by all of the staves 238. Stated differently, the staves 238 each capture signals from the transmitted pulse as it propagates around the casing 208. After a receiving time period during which the staves 238 capture signals from the transmitted pulse following transmission, another of the staves 238 is excited, followed by the receiving time period until each of the staves 238 has transmitted.

In one implementation, the forward wave 402 is created by sequentially firing pulses from the staves 238 with a controlled time interval between pulses, controlled frequency of the pulses, and/or a controlled phase of the pulses. By firing the staves 238 sequentially, the forward wave 402 is built up, traveling radially and consistent with the firing sequence. Thus, the forward wave 402 may be formed by adding the pulses together, even if each of the staves 238 is omnidirectional. Once the forward wave 402 is formed, the staves 238 are switched to receive energy and sense the forward wave 402 as it interacts with structures surrounding the casing 208, such as the cement 216. The forward wave 402 may propagate in a counterclockwise direction as illustrated in FIG. 4A. On the other hand, the forward wave 402 may be formed by firing one of the staves 238, listening on all of the staves 238, firing another of the staves 238 and listening again of all of the staves 238, and so on until each of the staves 238 has transmitted. During processing the captured signals are added together as described herein. In either case, during processing the received signals are shifted in time to remove the time interval 404 between the transmitted pulses. The forward wave 402 may be sensed at one or more axial positions along the production tube 206 as the radial sensor 102 is moved.

The received signals may be filtered to provide the same time delays. For illustration purposes, traces from five of the staves 238 are shown with time on a horizontal axis and signal on a vertical axis for each trace. As shown, the traces are arranged on the same time axis and displaced from each other on the vertical axis to highlight the relative timing of the pulses 404. The uniform time interval between transmission of the pulses 404 means that the pulses are arranged on a notional line with a positive gradient. The radial sensor 102 provides a dispersive system in which the velocity of acoustic waves change depending on its frequency. Transmission of the pulses 404 comprising multiple frequencies results in the forward wave 402, whose frequency components are separated in time.

Accordingly, the forward wave 402 has an overall pattern that is generally the same for each of the staves 238 in the absence of asymmetry due to the presence of any anomalies. The overall pattern of the forward wave 402 is offset by the same time intervals between the staves 238 as the transmitted pulses 404. Thus, the received signals may be filtered to provide the same time delays. Distinctive peaks in the traces (e.g., peaks 406, 408, and 410) are thus arranged on notational lines having approximately the same positive gradient as the pulses 404. The forward signals including the peaks 406, 408, and 410 may be combined together and converted from the time domain to the frequency domain to provide a forward spectrum, as illustrated in a plot 412 shown in FIG.

4B. The signals may be converted from the time domain to the frequency domain using a Fourier transform or similar transform.

In other words, the forward wave 402 has a spectrum of frequencies returned at different times. The pulses 404 are transmitted to generate Rayleigh waves traveling around the casing 208. As described in more detail herein, the Rayleigh waves may be formed when the forward wave 402 has a wavenumber distributed around the circumference of the radial sensor 102 for a frequency at a center of a range of interest. For example, the wavenumbers may be 3, 5, 6, or 7. The received signals from the forward wave 402 at each stave 238 over a period of time are processed to remove the time interval and summed and transformed into the forward spectrum. As shown in the example plot 412, certain frequencies in the forward wave 402 may be strong with a relatively large amplitude, for example approximately 5-7 kHz, 9-11 kHz, etc.

Figures 4C, 4D:
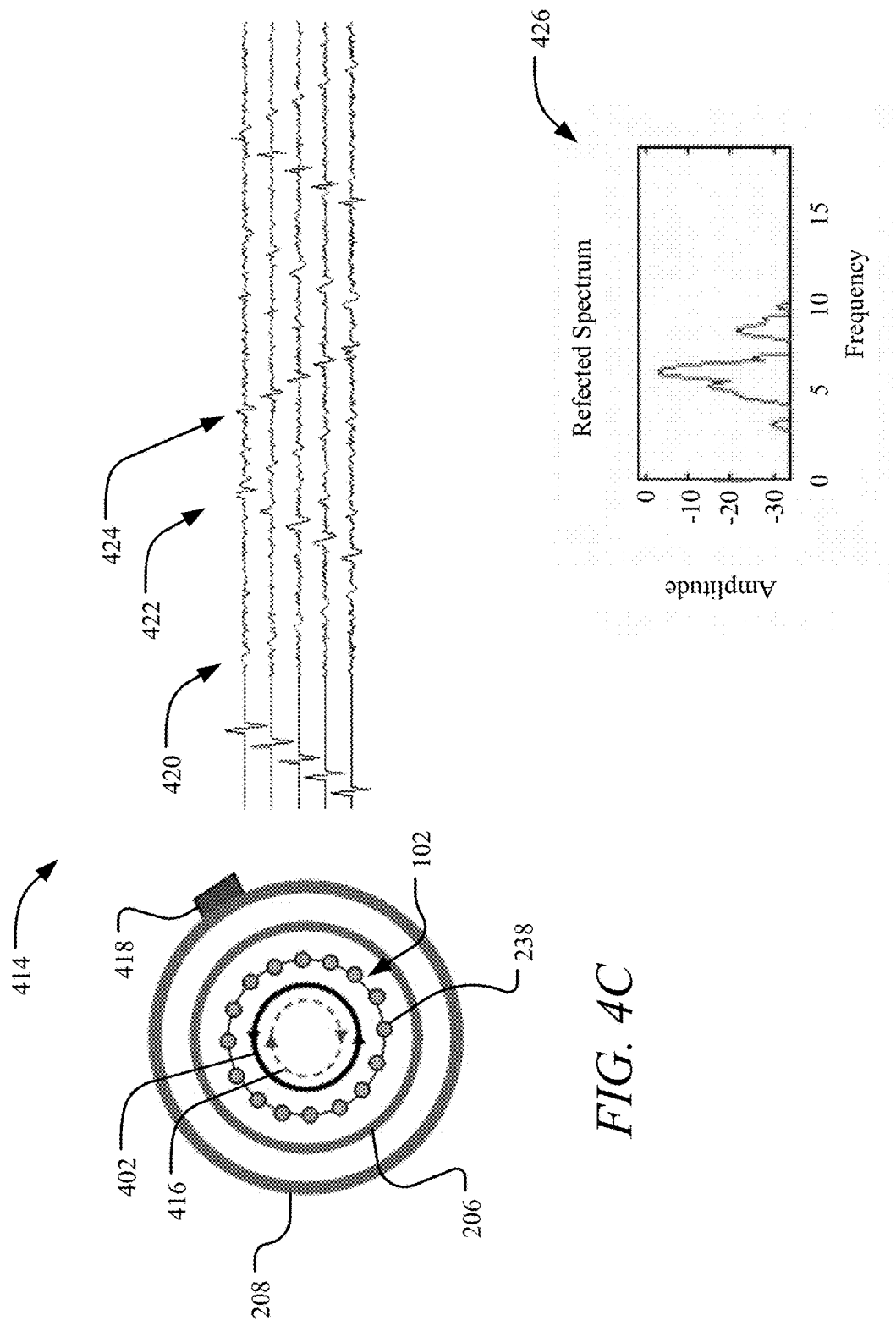
FIG. 4C is a cross sectional view of the radial sensor deployed in a well with an asymmetry in cement or a bond between a casing and the cement from which radial acoustic signals are received and processed.
FIG. 4D shows a plot of a reflected spectrum of the radial acoustic signals of FIG. 4C.

Turning to FIGS. 4C-4D, an asymmetric feature 418 is present outside the casing 208, which may be the anomaly 220. The forward wave 402 interacts with the asymmetric feature 418 to create a reflected wave 416. The reflected wave 416 travels in a direction opposite to the forward wave 402. In the example shown in FIG. 4C, the reflected wave 416 travels in the clockwise direction. Accordingly, the reflected wave 416 is received by the staves 238 in a reverse order from the forward wave 402. Thus, signals from the reflected wave 416 is superimposed in the traces. Distinctive peaks (e.g., peaks 420, 422, and 424) corresponding to the reflected wave 416 are disposed on notational lines with a negative gradient. As such, the forward wave 402 may be distinguished from the reflected wave 416. The reflected signals including the peaks 420, 422, and 424 may be combined together and converted from the time domain to the frequency domain to provide a reflected spectrum, as illustrated in a plot 426 shown in FIG. 4D. The signals may be converted from the time domain to the frequency domain using a Fourier transform or similar transform.

Figure 4E:
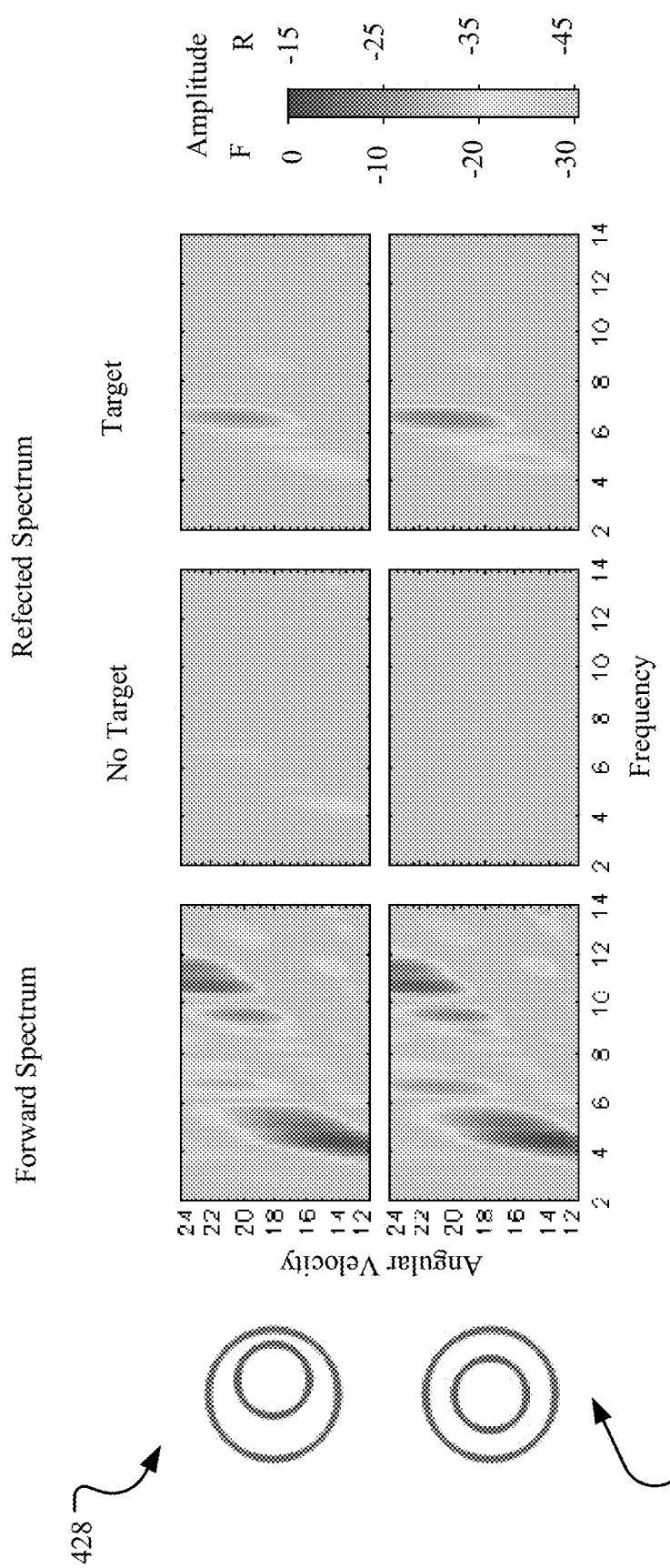
FIG. 4E illustrates a comparison of an effect of eccentricity on the forward and reflected spectra.

FIG. 4E illustrates a comparison of an effect of eccentricity on the forward and reflected spectra. Results for an eccentric configuration 428 of the production tube 206 within the casing 208 is compared with results for a concentric configuration 430 of the production tube 206 within the casing 208. The results for each of the configurations includes plots of the forward spectrum, as well as plots of the reflected spectrum where the asymmetrical feature 418 is included (labeled as "Target") and not included (labeled as "No Target"). Each of the plots includes angular velocity on the vertical axis and frequency on the horizontal axis with amplitude being depicted on a color intensity scale.

It will be understood that the production tube 206 generally always provides some form of eccentricity within the casing 208. For example, the production tube 206 may be resting against one side of an inner surface of the casing 208, such as in an inclined well, or an axis of the production tube 206 may be at an angle relative to the casing 208. This is particularly true since spacers are often not used to maintain the production tube 206 in the concentric configuration 430, wells are rarely truly vertical, and/or the like. As shown in FIG. 4E, the transmitted pulses 404 of the forward wave 402 are chirps with a range of frequencies. The forward wave 402 is the result of interaction of the transmitted pulses 404 with material surrounding the casing 208 and includes a spectrum of frequencies at different amplitudes. Stronger amplitudes are shown by darker areas in red. In the example of FIG. 4E, the forward wave 402 has strong amplitude components at approximately 4-5 kHz and at approximately 11 kHz over a range of angular velocities. Thus, the forward spectrum for both configurations 428 and 430 contains many modes that propagate at different frequencies and angular velocities, which is characteristic of a dispersive system.

The reflected spectrum of the reflected wave 416 is shown for each of the configurations 428 and 430. Where there is no target (no asymmetric features), the reflected wave 416 and thus the reflected spectrum is minimal (with only weak signals present, if any), as the forward wave 402 encounters no features that reflect the forward wave 402 sufficient to form the reflected wave 416. Where the asymmetric feature 418 is present, the different acoustic impedance of the asymmetric feature 418 relative to the cement 216 forms the reflected wave 416 with different frequencies and amplitudes depending on the angular velocity of the forward wave 402 and the reflected wave 416. In the example of FIG. 4E, only one mode reflects from the asymmetric feature 418, with the mode having a large displacement on the surface of the casing 208. This strong reflection is received at approximately 6-7 kHz when the angular velocity is approximately 17 and 24 krad/s.

As can be understood from FIG. 4E, the forward spectrum for both the eccentric configuration 428 and the concentric configuration 430 are generally the same. Similarly, the reflected spectrum for both the configuration 428 and the concentric configuration 430 are generally the same when the asymmetrical feature 418 is present and not present. Accordingly, the radial sensor 102 may be used to detect the presence of the asymmetrical 418, regardless of whether there is eccentricity of the production tube 206 relative to the casing 208.

Figure 5A:
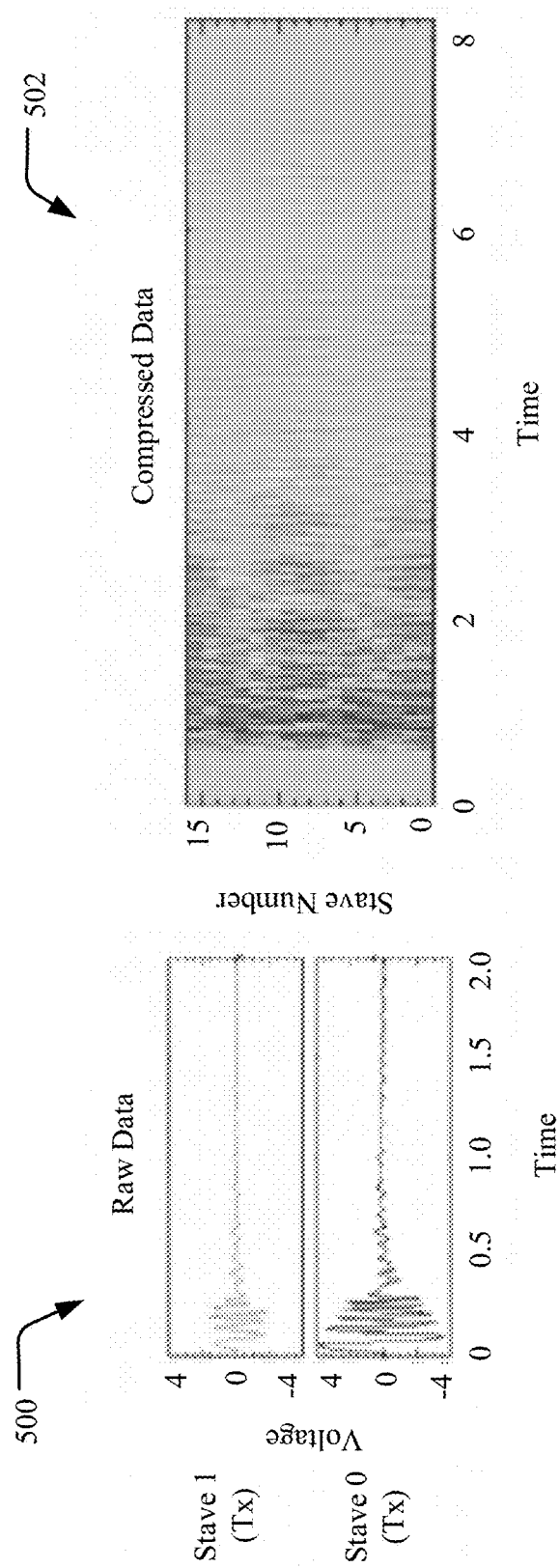
FIG. 5A shows raw data and compressed data for recorded waveforms during a transmission of the radial sensor.

To begin detailed description of the reconstruction method, reference is made to FIGS. 5A-5D. Turning first to FIG. 5A, recorded waveforms from a single transmission of one of the staves 238 is shown. In one implementation, a data recorder, for example integrated with or in communication with the controller 202, utilizes dedicated electronics to record the signals as raw data 500 at a wide bandwidth. For example, the data recorder may be set to 10,000 points at 1 μs per point (1 MS/s). The raw data 500 may be compressed into compressed data 502 and saved. Every transmission produces a dataset containing receiving waveforms for each of the staves 238. In the example described herein where there are sixteen of the staves 238, each transmission would produce sixteen receiving waveforms. The raw data 500 may be saved, for example, at every fourth point giving 2500 points at 4 μs sampling.

Each of the staves 238 may be numbered (e.g., 0-15). In the example shown in FIG. 5A, Stave 0 was the transmitting stave. The raw data 500 shows the output of Stave 0, as well as adjacent Stave 1. During a first period (e.g., approximately 300 μs), Stave 0 approximates zero voltage due to the short to ground. As shown in the raw data 500, voltage across the resistance, amplified by approximately +30 dB, shows a chirp of approximately +/−4V. Stave 1 also shows a similar chirp due to electrical pickup from the transmitting voltage as a result of the wires having a close proximity. The raw data 500 may be four times oversampled to focus on frequencies up to approximately 30 kHz as frequencies of interest. The oversampling of the raw data 500 improves signal-to-noise ratio. The raw data 500 is saved as the compressed data 502 for all of the staves 238 receiving the signal (e.g., Staves 0-15). The colors shown in the compressed data 502 have a logarithmic scale and show decay to −40 dB by approximately 7 ms. To generate the compressed data 502 from the raw data 500, data corresponding to an initial time period (e.g., the initial 500 μs) was blanked to zero to remove the transmission pulse, and the waveforms were band-limited to the frequencies of interest (e.g., band-limited to 30 kHz), and the waveforms were saved at every fourth point giving 512 points at 16 µs sampling.

Turning to FIGS. 5B-5E, the compressed data 502 is processed to obtain forward and reflected waves. As described herein, each of the staves 238 acts as a transmitter in transmitting a signal, and for each transmission by one of the staves 238, all of the staves 238 record the signal. A single measurement by the radial sensor 120 consists of the data recorded for all of the transmissions by the staves 238. For example, when one of the sixteen staves transmits, all sixteen staves record the transmission, and one measurement consists of sixteen transmissions, one on each stave. The single measurement is converted into a single result, as illustrated with FIGS. 5A-5E.

Figure 5B:
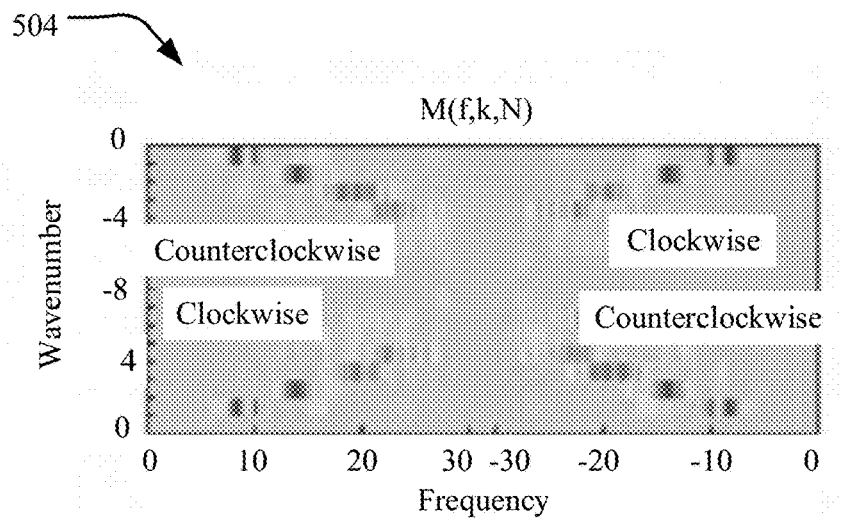
FIG. 5B illustrates the recorded waveforms separated into clockwise waves and counterclockwise waves following conversion to the frequency domain using a Fourier transform.

Generally, recorded waves are separated, shifted, and combined to obtain forward and reflected waves. Separation of the recorded waves in the compressed data 502 is illustrated in FIG. 5B. Separation of the waves is impractical in the time domain due to the radial sensor 102 creating a dispersive system with different frequencies traveling at different velocities. The radial sensor 102 includes the staves 238 arranged radially, such that the signal is traveling in both a first direction and a second direction, opposite the first direction, around the radial sensor 102 and that the signal completes itself arriving back at the transmission location. Accordingly, unlike the linear array, separation of the signals in the time domain is impractical.

In one implementation, the recorded waves in the compressed data 502 are converted to the frequency domain using a Fourier transform. Referring to FIG. 5B, the compressed data 502 as a single transmission in time and frequency for all of the staves 238 (e.g., transmission by one stave recorded on all sixteen staves). The single transmission of the compressed data 502 may be taken as an Nth transmission and is a function of time and angle, which may be described as m(t,θ,N). FIG. 5B illustrates separated waves 504 resulting from the Fourier transform of the compressed data 502. The Fourier transform is a function of frequency and wavenumber, which may be described as M(f,k,N), as complex quantity of which only the amplitude is shown.

More particularly, the Fourier transform decomposes the compressed data 502 into its constituent frequencies. Stated differently, the Fourier transform of the compressed data 502, which is a function of time, is a complex-valued function of frequency that provides wavenumbers corresponding to how many waves fit around the casing 208. For example, in the implementation having sixteen of the staves 238, there may be sixteen wavenumbers, with wavenumbers 1 to 7 propagating in a clockwise direction and wavenumbers −1 to −7 propagating in a counterclockwise direction. For wavenumber 4, each wave has four wavelengths around the casing 208 with different signal strengths. In the example shown in FIG. 5B, a strong wave at approximately 20 kHz had four wavelengths around the casing 208, but at 30 kHz, a wave is not present because there is not a mode of propagation that would provide four wavelengths around the casing 208 at a frequency of 30 kHz. Angular velocity is a ratio of the wavenumber to the frequency, which is illustrated in color. The red color demonstrates that there is primarily one angular velocity of the wave but the other colors show that there are other velocities at which the wave will propagate a well. Thus, the Fourier transform of the compressed data 502 from the time domain to the frequency domain separates the waves into the separated waves 504.

The separated waves 504 include clockwise waves and counterclockwise waves. The clockwise waves and the counterclockwise waves each appear twice in the separated waves 504 as complex conjugates.

Figure 5C:
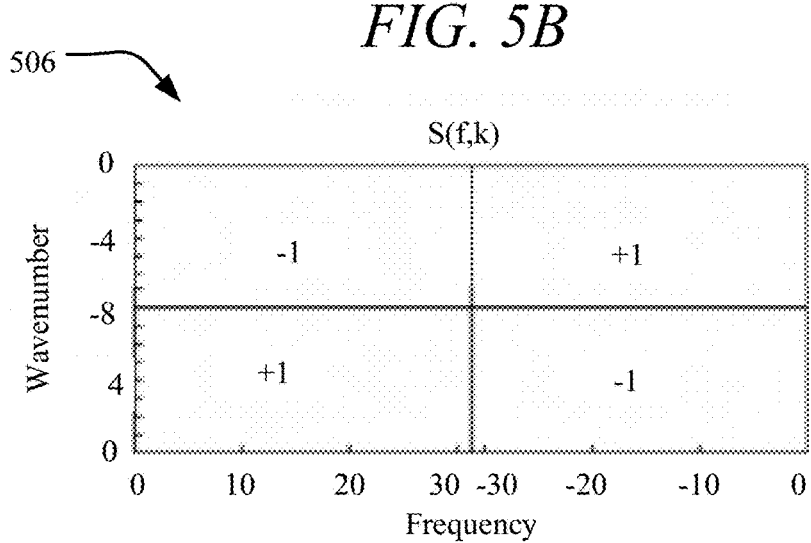
FIG. 5C shows shifting of the clockwise waves and the counterclockwise waves.

Turning to FIG. 5C, the clockwise waves and the counterclockwise waves of the separated waves 504 are shifted in opposite directions to generate shifted waves. The shift function 506 may be defined as S(f,k). The sections of the shift function 506 correspond to the clockwise waves and counterclockwise waves, as well as their complex conjugates. The counterclockwise waves are shifted −1 and the clockwise waves are shifted +1. Stated differently, the clockwise waves are forward shifted and the counterclockwise waves are backshifted.

In the example with sixteen staves, the wavenumber k ranges from −8 to +7 and the angular step size in radians between the staves is $$\theta = \frac{2\pi}{16}.$$

To find the angular rotation α for each point the complex plane, S is multiplied by the wavenumber k, the angular step size θ, and a number of steps corresponding to the transmission number N. The angular rotation may thus be given by:

$$\alpha = S(f,k) \times Nk\theta$$

The shift is given by multiplying the transmission by $e^{i\alpha}$:

$$R(f,k,N) = M(f,k,N) \times e^{i\alpha}$$

This provides the result for the Nth transmission. The result contains shifted versions of both the clockwise and counterclockwise waves, with the amplitude having the same relationship and the phases changing with the shift. The calculation is repeated for all the transmissions for each of the staves 238 (e.g., all sixteen transmissions) and the results are added:

$$R(f,k) = \Sigma R(f,k,N)$$

Figure 5D:
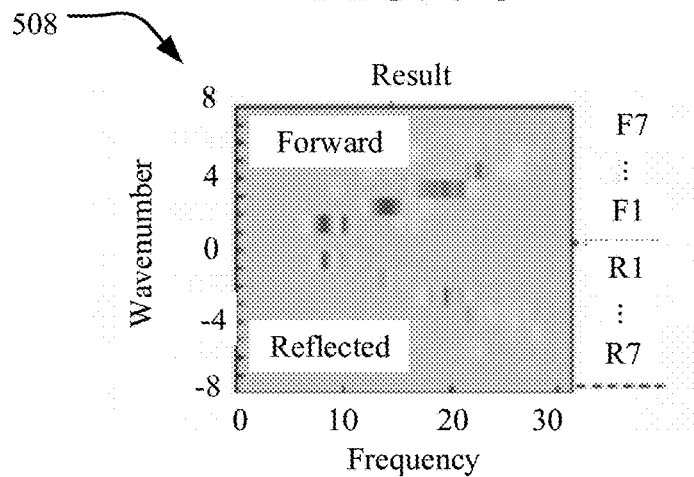
FIG. 5D illustrates a region of interest including forward and reflected waves generated by adding the shifted clockwise waves and the shifted counterclockwise waves.

By adding the shifted counterclockwise waves together, a reflected wave is formed, and the shifted clockwise waves are added together to form a forward wave. The results 508 for a region of interest are illustrated in FIG. 5D. In one implementation, the region of interest may be limited to the positive frequencies of the forward and reflected waves and their amplitudes. Stated differently, the waves having negative frequencies are complex conjugates of the waves having positive frequencies, the complex conjugates may be discarded, with the region of interest focusing on the positive frequencies of the forward and reflected waves and their amplitudes. For clarity, the region of interest of the results 508 may be shifted vertically such that the zero wavenumber appears in the middle with the forward waves located at the top and the reflected waves at the bottom of the results 508.

Figure 5E:
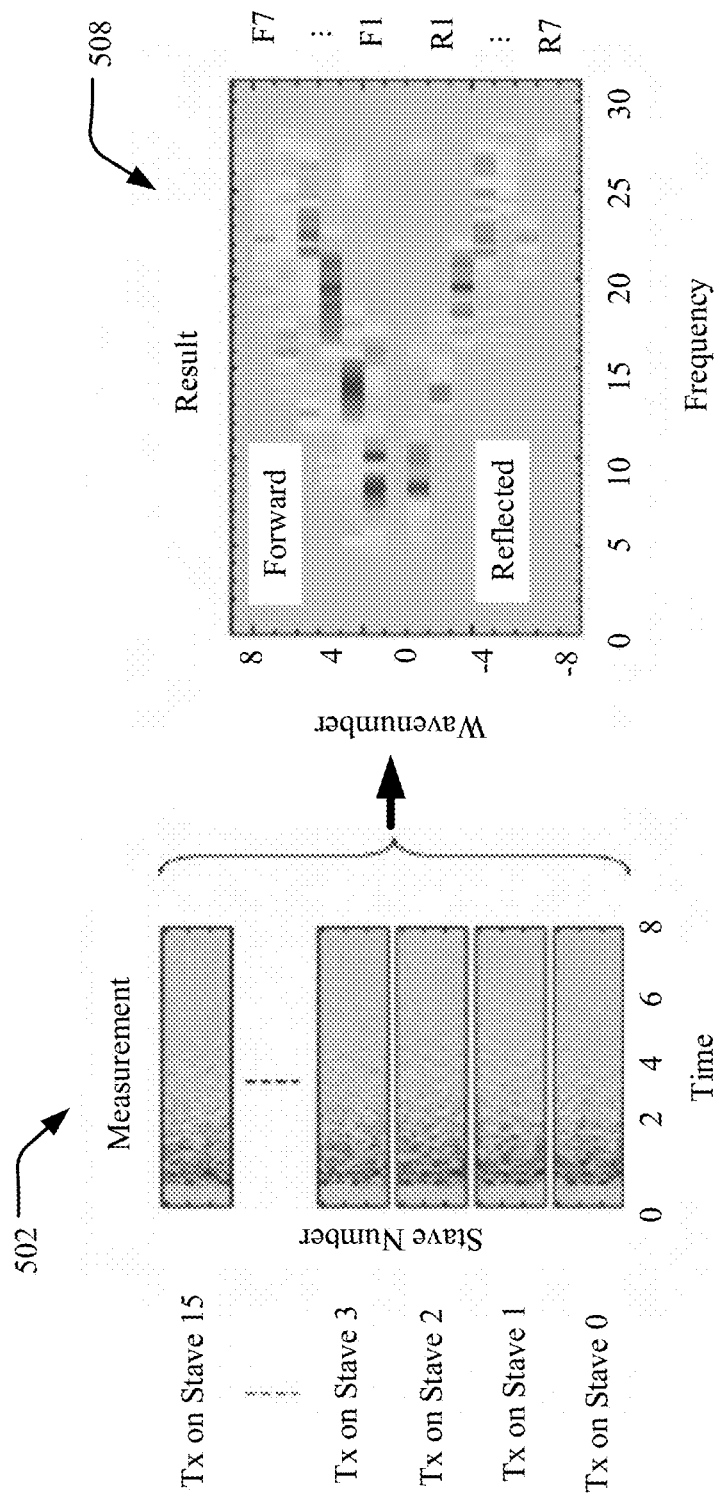
FIG. 5E illustrates a single measurement by the radial sensor converted into a single result.

As shown in FIG. 5E, generally the compressed data 502 for each of the staves 238 is converted from the time domain to the frequency domain, shifted, and combined into the result 508. Each horizontal line corresponds to a spectrum, and reading from zero wavenumber, the forward spectra are F1 to F7 and the reflected spectra are R1 to R7. The horizontal lines of 0 and 8 do not have a direction. As described herein, the wavenumbers are integers corresponding to a number of wavelengths fitting around the production tube 206 and/or the casing 208. For example, R2 has long waves with just two fitting around the production tube 206 and/or the casing 208, and R6 has shorter waves with six fitting around.

Figure 6A:
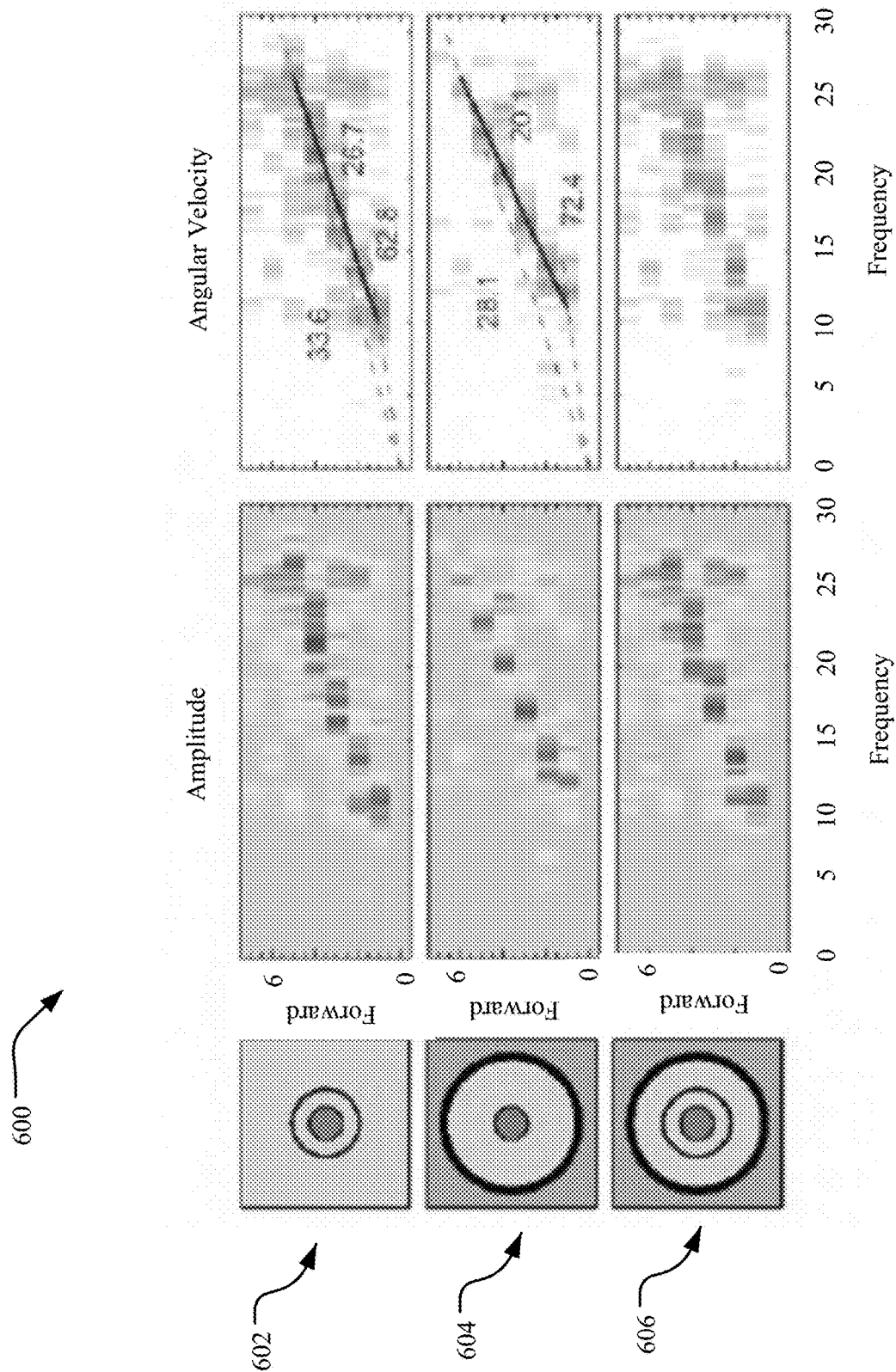
FIG. 6A shows a comparison of wave propagation through a production tube, a casing, and a production tube and casing.
Figure 6B:
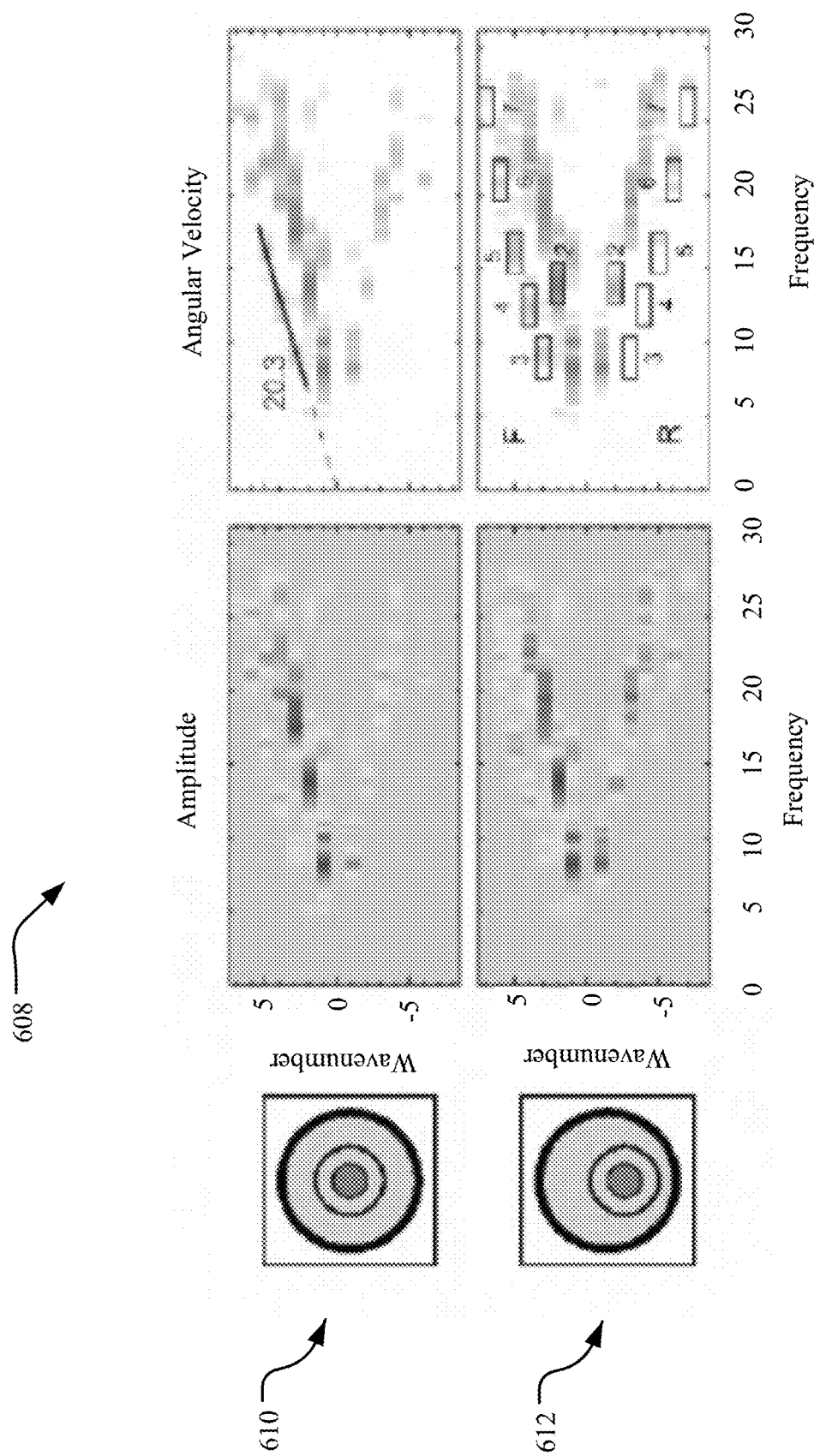
FIG. 6B illustrates a comparison of wave propagation through a production tube that is concentric and eccentric.

Referring to FIGS. 6A-6B, an analysis of eccentricity and orientation of the production tube 206 inside the casing 208 is provided. Turning first to FIG. 6A, modeling 600 provides an analysis 602 of the production tube 206, and analysis 604 of the casing 208, and an analysis 606 of the production tube 206 within the casing 208 are provided for comparison of wave propagation. For each analysis 602-606, forward waves obtained as described with respect to FIGS. 5A-5E, with the results including the amplitudes of the forward waves. The configurations associated with the analyses 602-606 do not include any asymmetrical features, such that there is no reflected wave.

With respect to the analysis 602, the results include a bright red diagonal corresponding to a primary mode propagating with a primary angular velocity around the production tube 206 corresponding to the blue line. In other words, a diagonal in the frequency domain corresponds to a velocity. The angular velocity may be converted to a linear velocity. For example, the angular velocity for the analysis 602 may be approximately 26.7 krad/s, which is approximately 1430 m/s as a linear velocity. The angular velocity for the analysis 604 may be approximately 20.1 krad/s, which converts to a linear velocity of approximately 2310 m/s. The group velocities of 1430 m/s and 2310 m/s illustrate a correspondence to Lamb waves in the production tube 206 due to fluid being present on both sides and a correspondence to Rayleigh waves in the casing 208 due to a solid being present on one side due to the cement 216.

As illustrated by the blue line not intersecting the origin, the analysis 602 and 604 are characteristic of a dispersive system, where different frequencies travel with different modes. Tangents to the upper and lower ends of the blue line, shown in red, are at 33.6 krad/s and 62.8 krad/s for the analysis 602 and at 28.1 krad/s and 72.4 krad/s for the analysis 604. The red lines are phase velocities, which are higher than a group velocity shown in blue. In terms of angular frequency $\omega=2\pi f$, the group velocities are $$\frac{\omega}{k} \text{ and } \frac{d\omega}{dk}.$$

In other words, a peak or a trough at the back of a wave group will move gradually towards the front.

As shown with a comparison between the analyses 602-604, the blue lines in each are very similar because the difference in the angular velocities of the production tube 206 and the casing 208 is roughly the same as the difference in their radii. Accordingly, separation of the production tube 206, which is not of interest, from the casing 208, which is of interest appears to be impractical in this manner according to the modeling 600.

However, turning to FIG. 6B, in practice, measured results 606 including an analysis 610 of the production tube 206 in the casing 208 in a concentric configuration and an analysis 612 of the production tube in the casing 208 in an eccentric configuration. Both the forward and reflected spectra are included for each of the analyses 610-612. Conceptually, the concentric configuration would not include reflected spectra due to the concentricity, as detailed herein. However, in practice, true concentricity is typically not achieved, for example due to the centralizers 106 being loose enough to allow free movement inside the production tube 206. As such, the small amount of eccentricity present in the concentric configuration corresponding to the analysis 610 results in faint a reflected spectrum.

The analysis 610 shows a strong amplitude in the middle in red that was predicted by the modeling 600. This amplitude is unsuitable for anomaly detection as discussed above. However, there is a fainter amplitude above the strong amplitude that is marked with the blue line in the angular velocity plot. The blue line is a different propagation mode having an angular velocity of approximately 20.3 krad/s and a linear velocity of approximately 2340 m/s. The blue line is a non-dispersive velocity that is traveling in what would otherwise be a dispersive system. Using the non-dispersive velocity, the production tube 206 may be separated from the casing 208 for analysis of the casing 208. Further, it will be appreciated that other dispersive velocities may exist that can be utilized to separate the production tube 206 from the casing 208.

The analysis 612 shows that eccentricity results in a strong reflected wave, even if there are no anomalies present outside the casing 208. Generally, the spectra do not provide useful information. However, the boxes around portions of the forward spectrum and the reflected spectrum identify useful information. The boxes identifying portions of the forward spectra generally provide information on eccentricity and orientation of the production tube 206 within the casing 208, and the boxes identifying portions of the reflected spectra generally provide information regarding isolation and material type, as well as eccentricity. The portions of the forward spectrum that may provide information regarding eccentricity and orientation include F2, F3, F4, and F7, for example. The portions of the reflected spectrum that may provide useful information regarding orientation R2, R3, and R5, for example. It will be appreciated that the number of the staves 238 can be in any order based on eccentricity of the production tube 206 and the casing 208. As such the reference to the numbering is for illustration purposes only and not intended to be limiting. Each box in this example has a 2.8 kHz bandwidth, and Table 1 below provides more detail for each of the boxes:

TABLE 1

| Spectrum | Center Frequency (kHz) | Character |
|---|---|---|
| F2, R2 | 14 | Provides an amplitude reference, as it is well away from the propagation mode of interest and shows almost no variation with any other parameters. |
| F3, R3 | 9 | F3 is sensitive to impedance, such that it may be used to indicate cement, while R3 is sensitive to impedance and highly sensitive to eccentricity and anomalies. |
| F4 | 12.5 | F4 has a frequency that at a peak amplitude varies with eccentricity but not with any other parameters. |
| R5 | 16 | R5 is sensitive to impedance and highly sensitive to eccentricity and anomalies. |
| F7 | 26 | F7 has a frequency that at a peal amplitude is high when concentric but very low otherwise, even for just slight eccentricity. |

As can be understood from the table, F2 and R2 may be used as a reference. For example, because F2 is almost completely independent of any other changes, where environmental changes in the downhole environment 200 occur (e.g., temperature, pressure, etc.), F2 may be used as a reference or calibration. While F3 may be used to indicate material type, such as cement, R3 and R5 are highly sensitive to isolation detection and material type identification.

F4 provides may be used to detect eccentricity, and F7 may be used in combination with F4. Orientation may be found using convolution to detect the axis of symmetry, followed by phase comparison with a known reference to determine axis alignment.

Figure 7A:
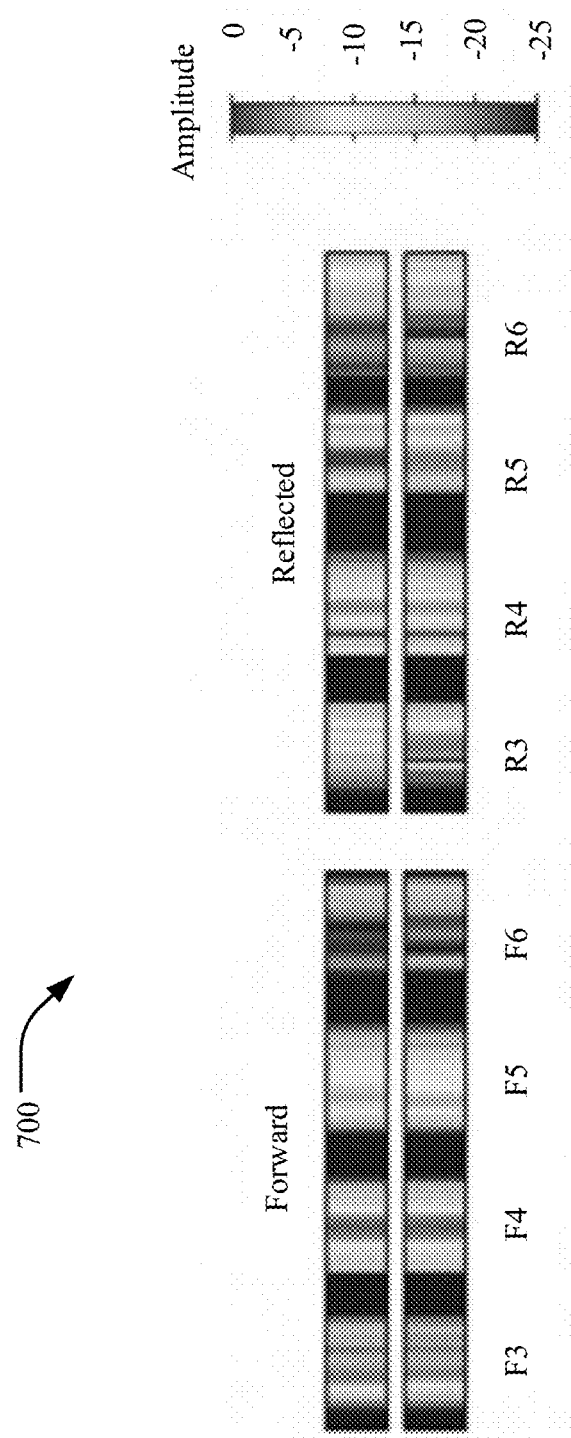
FIG. 7A shows a comparison of forward and reflected spectra when air is in a channel versus water in the channel.
Figure 7B:
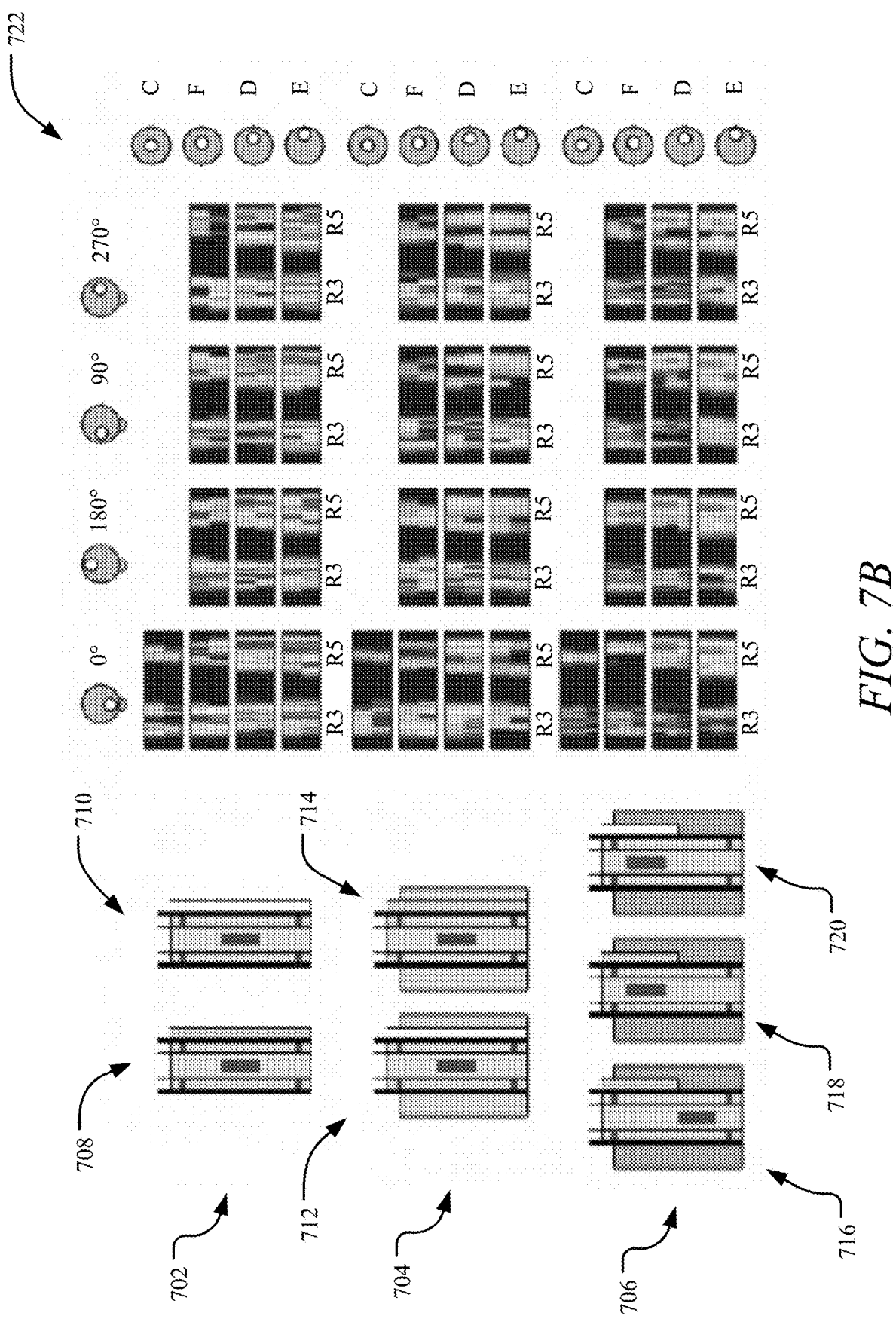
FIG. 7B depicts a comparison of channel detection in a lining around a casing in various production rig configurations.
Figure 7C:
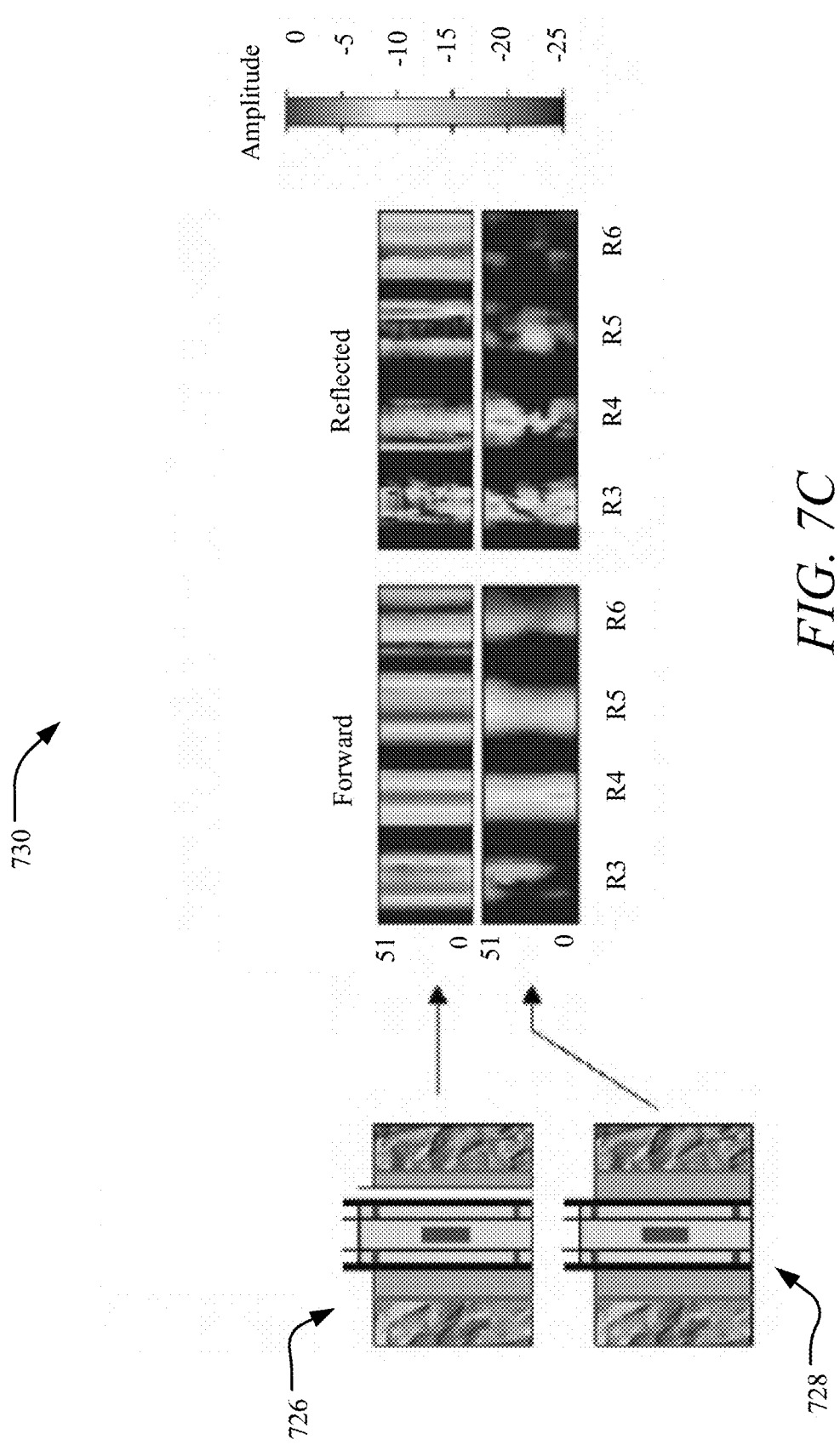
FIG. 7C illustrates a comparison of channel detection in various formations.

For a more detailed discussion on isolation detection and material type identification, reference is made to FIGS. 7A-7C. In the example of FIG. 7A, results 700 including forward and reflected spectra are shown for a wellbore including a water lining. The top of the forward and reflected spectra are results corresponding to the presence of an anomaly, and the bottom of the forward and reflected spectra are results corresponding to the absence of an anomaly. As shown in the results 700, the forward spectra show almost no change with the presence of the anomaly 220, and R4 and R6 remain unchanged as well. However, R3 and R5 differ significantly with the presence and absence of the anomaly 220, such that R3 and R5 provide isolation detection.

Turning to FIG. 7B, various example configurations showing reflected spectra are illustrated. A first configuration 702 includes air surrounding the casing 208, a second configuration 704 includes water surrounding the casing 208, and a third configuration 706 includes the cement 216 surrounding the casing 208 for comparison. The first configuration 702 includes a water filled channel configuration 708 and an air filled channel configuration 710. Similarly, the second configuration 704 includes an air filled channel configuration 712 and a water filled channel configuration 714. The third configuration 706 includes a cement channel configuration 716, a water filled channel configuration 718, and an air filled channel configuration 720.

Results 722 are shown for each of the configurations 708-720 of the first, second, and third configurations 702-706 for differing levels of eccentricity represented by C, F, D, and E. As can be understood from the representations in FIG. 7B, C is generally concentric, and F-E increase in eccentricity from very slight in F to high eccentricity in E. The results 722 further include different orientations of the production tube 206, as shown in the representations along the top. The orientation is defined clockwise relative to the channel at 0° in this example. For each orientation and eccentricity, the results 722 are provided at R3 and R5 for the configurations 708-720. For the first configuration 702, the configuration 708 corresponds to the top of each plot of the results 722 for each orientation and eccentricity, and the configuration 710 corresponds to the bottom of each plot. Similarly, for the second configuration 704, the configuration 712 corresponds to the top of each plot of the results 722 for each orientation and eccentricity, and the configuration 714 corresponds to the bottom of each plot. Finally, for the third configuration 706, the configuration 716 corresponds to the top of each plot of the results 722 for each orientation and eccentricity, the configuration 718 corresponds to a middle of each plot, and the configuration 720 corresponds to the bottom of each plot. As can be understood from the results 722, the channel in a lining around the casing 208 in each of the configurations 708-720 is detected, with it being visible in R3 and/or R5. The eccentricity is also visible in the spectra.

Referring to FIG. 7C, example configurations including the formation 218 disposed outside the cement 216 are illustrated. As discussed herein, the formation 218 may include rock layers, voids, and is acoustically reflective. Configuration 726 includes the formation 218 and the cement 216, where the cement 216 has de-bonded from the casing 208. Configuration 728 includes the formation 218 and the cement 216, where the cement 216 has remained bonded to the casing 208. In each of the configurations 726-728, the radial sensor 102 was translated axially within the production tube 206 to generate a log from a bottom to a top with positions labeled as 0-51. As such, in this example, there were 50 steps of approximately 15 mm, and a total travel distance of 0.75 m, such that each log consists of 51 spectra in the results 730. As shown in the results 730, the radial sensor 102 is highly sensitive to impedance where the results 730 readily show a difference between bonded cement in the configuration 728 and de-bonded cement in configuration 726. Even in the forward spectra, the difference when cement is present is apparent. Broad blurred spectra indicates presence of the cement 216.

Figure 8:
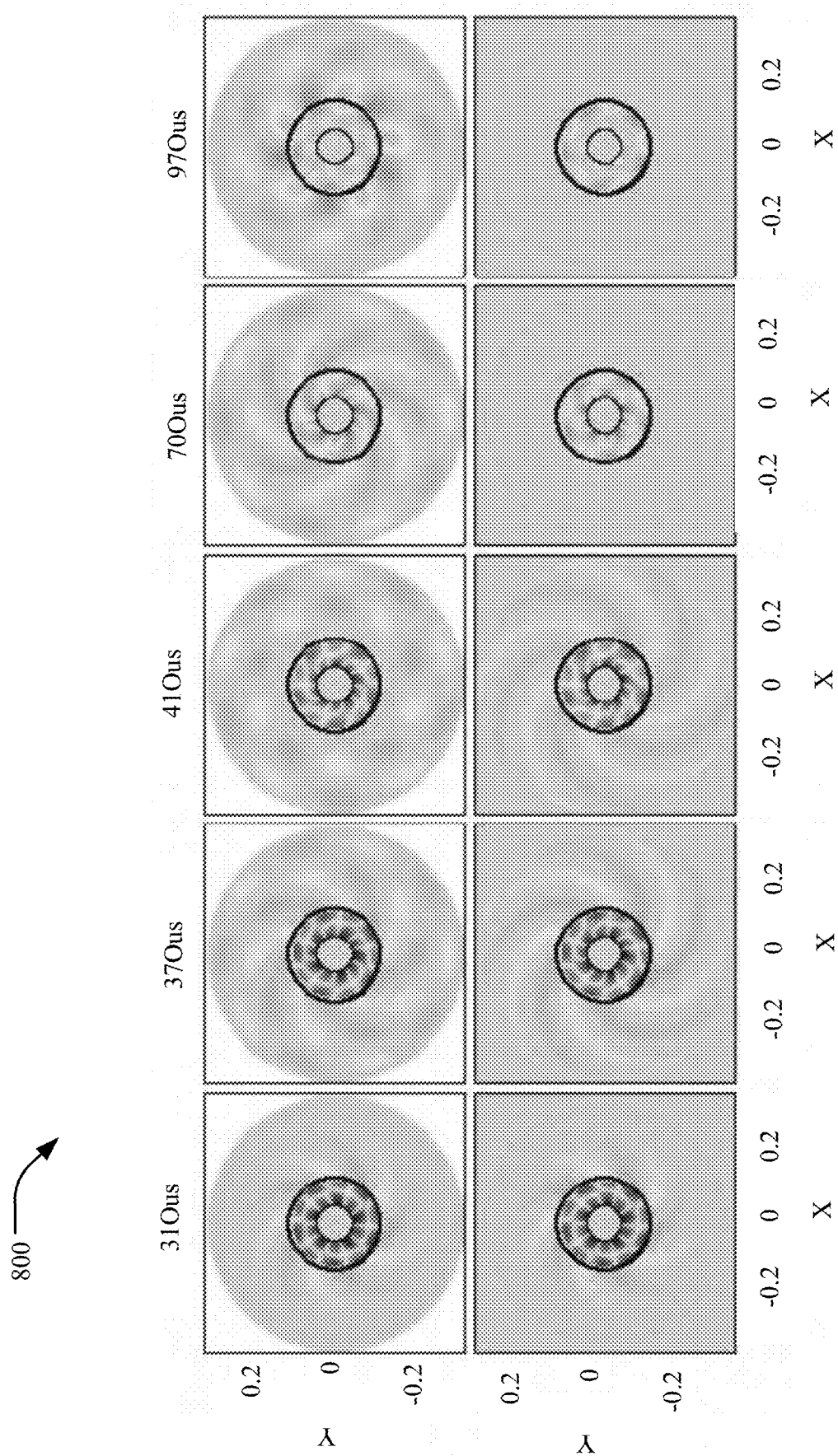
FIG. 8 depicts a penetration of the propagating waves into different formations.

Turning to FIG. 8, representations 800 of wave penetration into the cement 216 illustrate signal decay. The representations 800 in the example of FIG. 8 show only waves corresponding to F5. The grey disk at the center of each representation 800 corresponds to the radial sensor 102 and the thick black line corresponds to the casing 208. In the representations 800, the production tube 206 is omitted for clarity. Outside the casing 208 is the cement 216. In the example of FIG. 8, the cement 216 is a 200 mm lining. The top row of the representations 800 has air outside the cement 216 and the bottom row includes the formation 218 outside the cement 216, which may be approximated as a high impedance material extending to infinity. As shown in each of the representations 800, most of the energy from the wave is confined between the radial sensor 102 and the casing 208, as shown with the bright colors.

As described herein, when waves traveling the casing 208 with fluid on one side (i.e., on an inside of the casing 208) and solid on the other side (i.e., the cement 216 and the formation 218 outside the casing 208), the propagating waves are Rayleigh waves. As can be understood from FIG. 8, where air exists beyond the cement 216, the energy cannot easily escape, with the waves being reflected back into the cement 216 at the cement-air boundary. Where the formation 218 exists beyond the cement 216, the waves are not reflected back into the cement 216 at the cement-formation boundary, instead dissipating into the formation 218. The representations 800 show that the wave propagation may characterize the cement 216 and the relationship with the formation 218, without providing unnecessary detail about the characteristics of the formation 218 itself.

In the example of FIG. 8, the representations 800 show that at 310 µs, the Rayleigh waves are outside the casing 208 and by 370 µs, the Rayleigh waves have travelled to 200 mm. As shown in the representations 800, at this point, the Rayleigh waves start to reflect from the air in the top row and decay as energy radiates away as the Rayleigh waves propagate into the formation 218 in the bottom row. Generally, the Rayleigh waves penetrate about one wavelength from a boundary, such as the casing 208, into a solid medium, such as the formation 218. For F5, there are five wavelengths around the casing 208. For a casing circumference of approximately 720, $\lambda=144$ mm. The color scale of the representations 800 is logarithmic. From a surface of the casing 208 to an edge of the representations 800, the pressure decreases by approximately 6 dB in the bottom row. As such, an object placed at 200 mm would have an amplitude of −12 dB compared with when the object is placed close to the casing 208. This detection threshold of approximately −12 dB corresponds to the threshold at which detection of a presence or absence of a target may occur. Thus, the spectra in F5 and R5 may be focused on features within the detection threshold (e.g., 200 mm from the casing 208). This is slightly farther than one wavelength.

As shown in the representations 800, a signal that continues for a long time provides narrow spectral lines, as shown in the top row. Rapid decay of amplitude, as shown in the bottom row, creates wide spectral lines. The high impedance of the formation 218 thus causes spectra that are not only fainter due to low amplitude but also appear blurred. Further higher wavenumbers decay more rapidly, with the reflected spectra becoming more blurred, such as from R3 to R6 in FIG. 7C for example. Gas or fluid outside the casing 206 would thus provide narrow spectral lines, and the cement 216 would provide wider lines where the cement 216 is bonded to the formation 218. On the other hand, isolation regions will appear blurred. R3 has narrower line but a longer wavelength, such that it penetrates farther into the formation 218, and R5 has blurred lines with a lower penetration. As such, R3 and R5 combined provide enhanced isolation detection.

Figure 9:
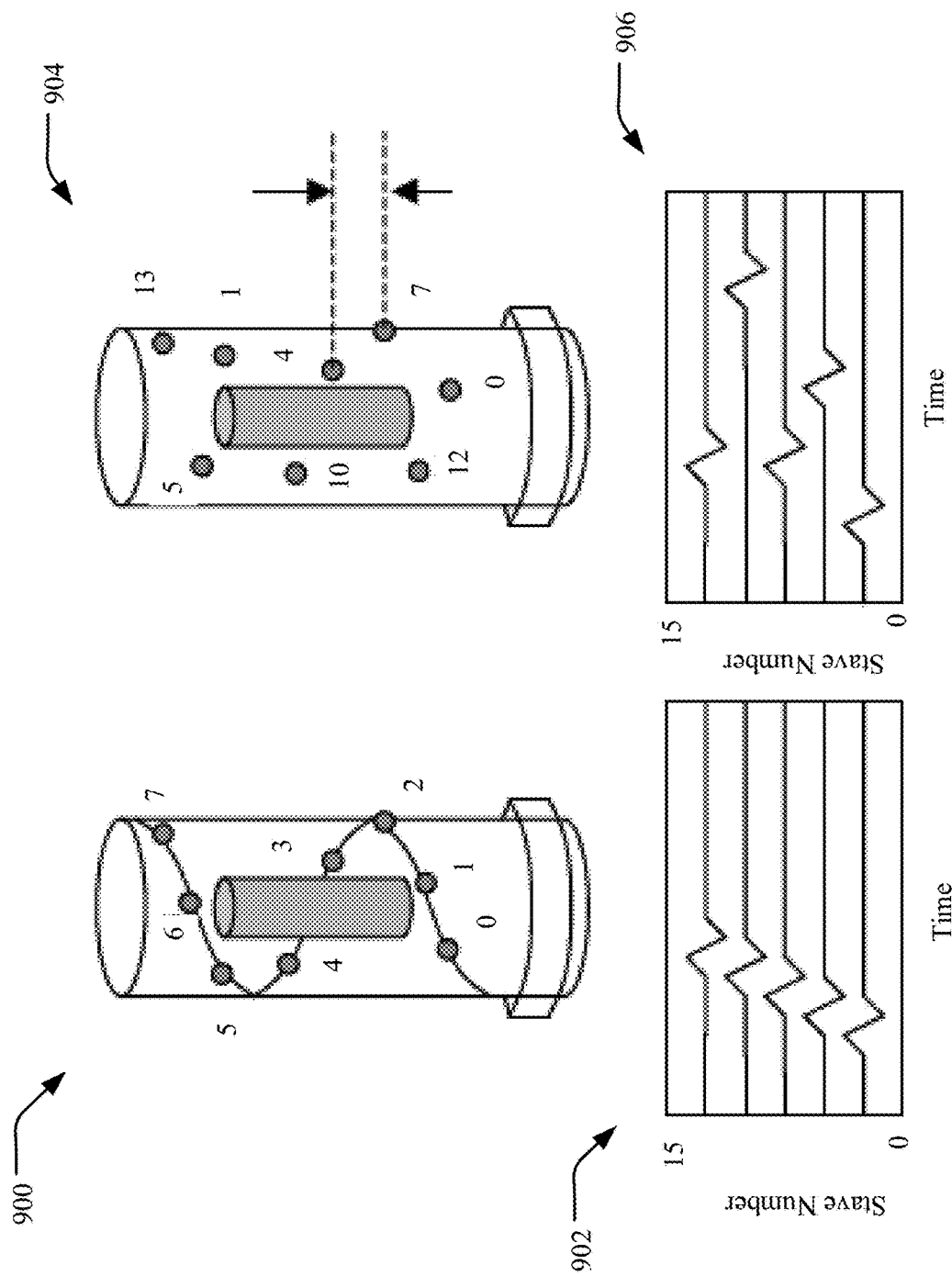
FIG. 9 illustrates recording the acoustic waves during movement of the radial sensor.

As can be understood from FIG. 9, the acoustic waves may be recorded during continual movement of the radial sensor 102 along the production tube 206. A transmission sequence 900 includes the staves 238 being pinged in a sequential order as the radial sensor 102 moves axially within the production tube 206. The transmitted signals are reflected off collars on both the production tube 206 and the casing 208 used to join axial sections together. These axially reflected waves from the collars will be received by the radial sensor 102 and may interact with radially reflected waves producing false spectral lines. Accordingly a transmission sequence 904 utilizes a non-sequential order (e.g., a random order), where the recorded signals are rearranged based on the known firing sequence of the non-sequential order, thereby avoiding false spectral lines arising from axial waves reflected from the collars.

Figure 10:
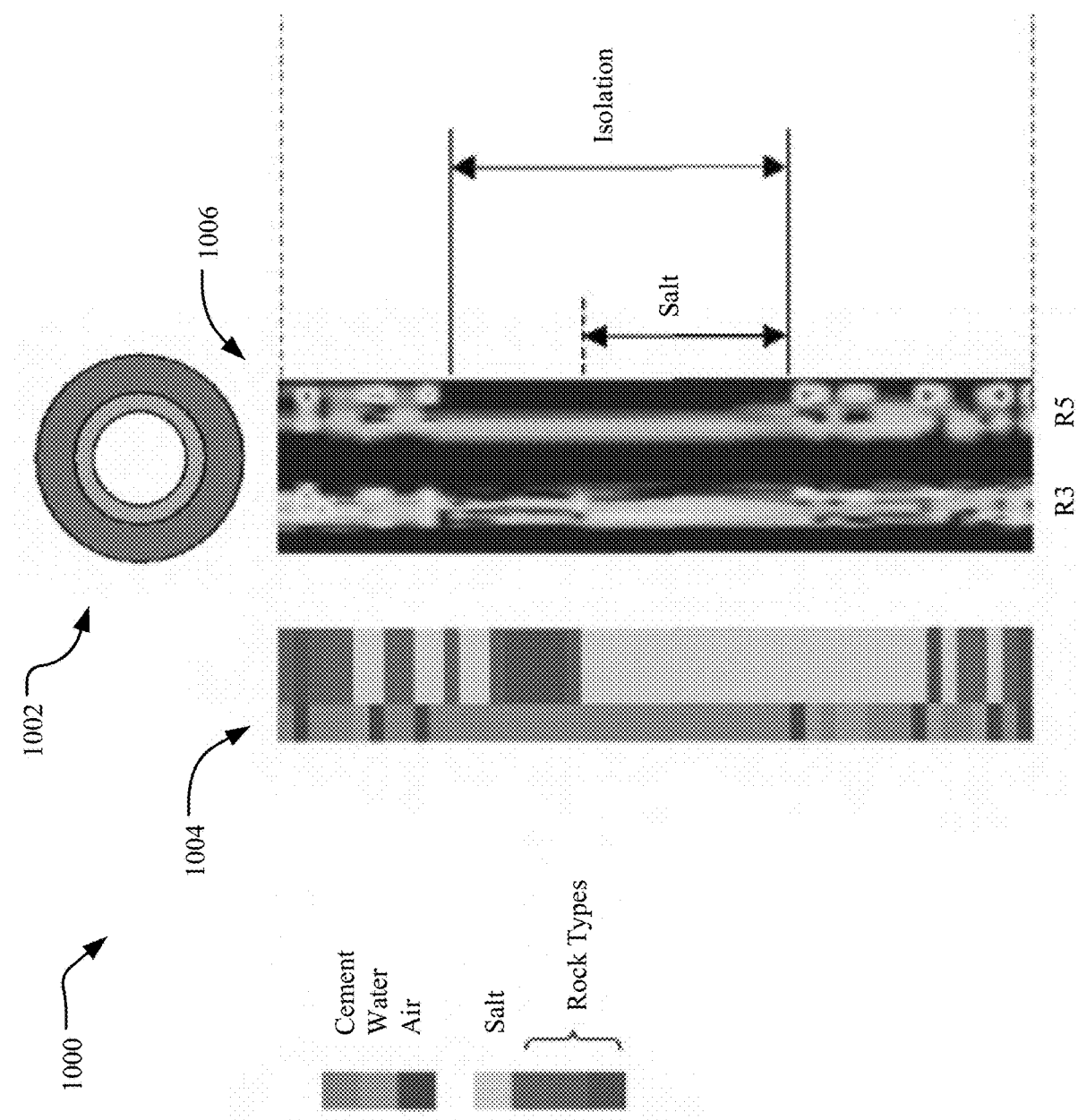
FIG. 10 illustrates example isolation in a radial log.

Turning to FIG. 10, an example log 1000 of an isolation region. The isolation region of the example in FIG. 10 is approximately 20 m long. A configuration 1002 includes the cement 216 outside the casing 208 and the production tube 206. No channel is present. A diagram 1004 illustrates the cement 216 with the formation 218 made from different types of rock. The cement 216 is continuous in some regions and includes the anomalies 220 in some regions where it is filled with air or water. The continuous regions of the cement 216 that are unbroken give a continuous log and show isolation in spectra 1006 of R3 and R5. The spectra 1006 of R3 and R5 has low penetration and shows cement, while R3 penetrates farther and provides addition formation details in addition to cement. For example, if R3 is continuous, the formation 218 has no features, and may include salt or a similar material which flows. As such, in the isolation region, R5 shows no changes, as R5 penetrates only into the cement 216. R3 has a longer wavelength and this propagates into the formation 218 and detects formation features, such as salt. Knowing that salt is present may be helpful in isolation detection because salt may flow to form a right seal around the casing 208. In the presence of salt, R3 will similarly show no features in the spectra 1006. The spectra 1006 will vary in the presence of a channel, as detailed herein.

It will be appreciated that in some implementations, multiple casings may be utilized. As described herein, the presently disclosed technology separates the production tube 206 from the casing 208 mathematically using angular velocity. Similarly, multiple casings may be separated based on a difference in the angular velocities. An outer casing will have a similar linear velocity to the casing 206 but because the radius is much larger, the outer casing will have a different angular velocity. Further, each casing may have different sensitive reflection.

Figure 11:
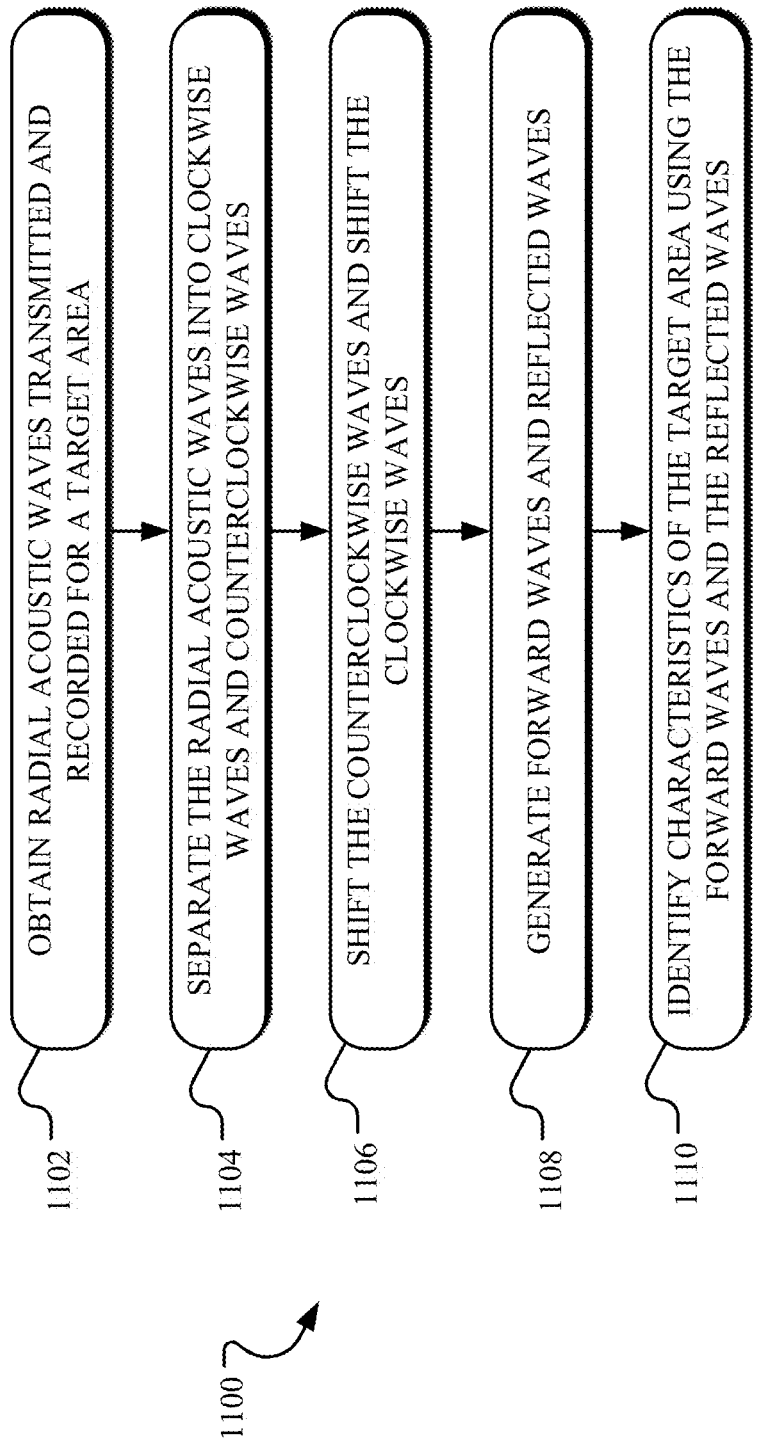
FIG. 11 illustrates example operations for analyzing a subterranean structure.

Referring to FIG. 11, example operations 1100 for analyzing a subterranean structure are illustrated. In one implementation, an operation 1102 obtains radial acoustic waves transmitted and recorded for a target area, and an operation 1104 separates the radial acoustic waves into clockwise waves and counterclockwise waves. An operation 1106 shifts the counterclockwise waves into shifted counterclockwise waves and shifts the clockwise waves into shifted clockwise waves. An operation 1108 generates forward waves from the shifted clockwise waves and reflected waves from the shifted counterclockwise waves, and an operation 110 identifies characteristics of the target area using the forward waves and the reflected waves.

Figure 12:
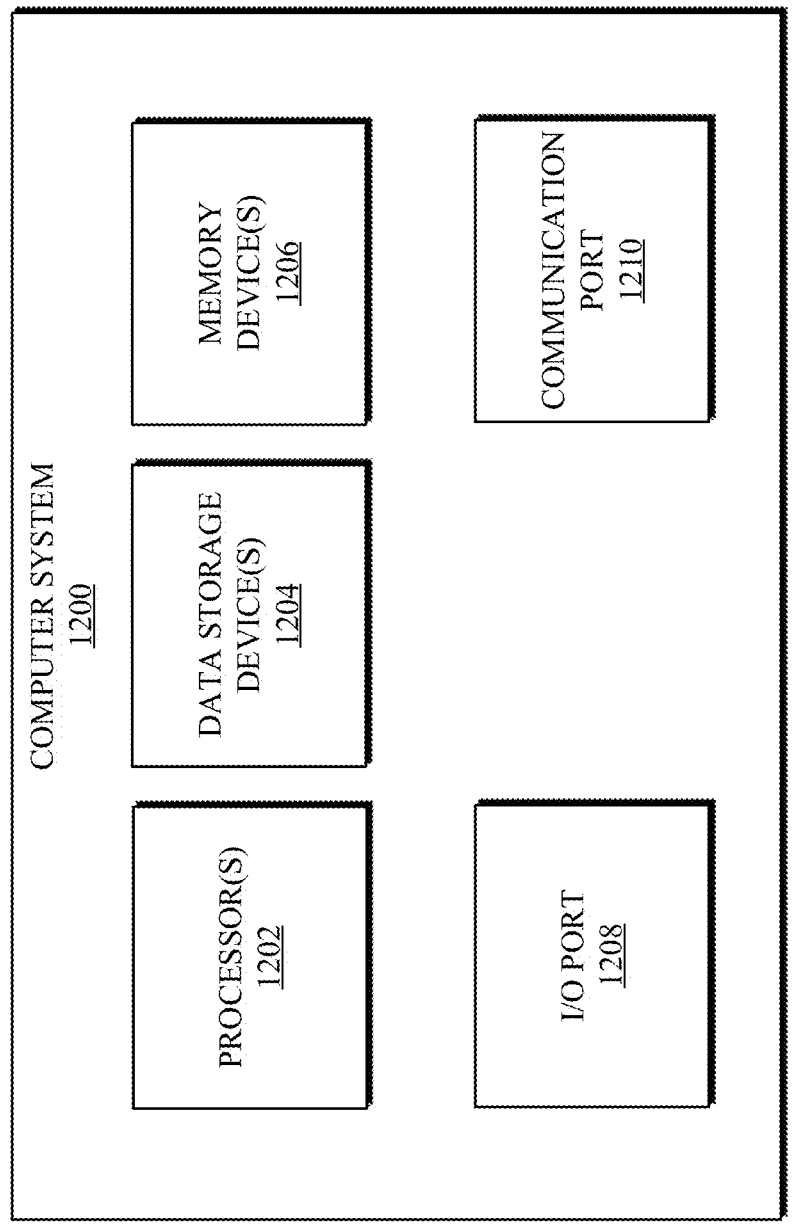
FIG. 12 depicts an example computing system that may implement various systems and methods discussed herein.

Referring to FIG. 12, a detailed description of an example computing system 1200 having one or more computing units that may implement various systems and methods discussed herein is provided. The computing system 1200 may be applied to the controller 202, data recorder, and/or the like and may be used in connection with processing, as described herein. It will be appreciated that specific implementations of these devices may be of differing possible specific computing architectures not all of which are specifically discussed herein but will be understood by those of ordinary skill in the art.

The computer system 1200 may be a computing system is capable of executing a computer program product to execute a computer process. Data and program files may be input to the computer system 1200, which reads the files and executes the programs therein. Some of the elements of the computer system 1200 are shown in FIG. 12, including one or more hardware processors 1202, one or more data storage devices 1204, one or more memory devices 1208, and/or one or more ports 1208-1210. Additionally, other elements that will be recognized by those skilled in the art may be included in the computing system 1200 but are not explicitly depicted in FIG. 12 or discussed further herein. Various elements of the computer system 1200 may communicate with one another by way of one or more communication buses, point-to-point communication paths, or other communication means not explicitly depicted in FIG. 12.

The processor 1202 may include, for example, a central processing unit (CPU), a microprocessor, a microcontroller, a digital signal processor (DSP), and/or one or more internal levels of cache. There may be one or more processors 1202, such that the processor 1202 comprises a single central-processing unit, or a plurality of processing units capable of executing instructions and performing operations in parallel with each other, commonly referred to as a parallel processing environment.

The computer system 1200 may be a conventional computer, a distributed computer, or any other type of computer, such as one or more external computers made available via a cloud computing architecture. The presently described technology is optionally implemented in software stored on the data stored device(s) 1204, stored on the memory device(s) 1206, and/or communicated via one or more of the ports 1208-1210, thereby transforming the computer system 1200 in FIG. 12 to a special purpose machine for implementing the operations described herein. Examples of the computer system 1200 include personal computers, terminals, workstations, mobile phones, tablets, laptops, personal computers, multimedia consoles, gaming consoles, set top boxes, and the like.

The one or more data storage devices 1204 may include any non-volatile data storage device capable of storing data generated or employed within the computing system 1200, such as computer executable instructions for performing a computer process, which may include instructions of both application programs and an operating system (OS) that manages the various components of the computing system 1200. The data storage devices 1204 may include, without limitation, magnetic disk drives, optical disk drives, solid state drives (SSDs), flash drives, and the like. The data storage devices 1204 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1206 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1204 and/or the memory devices 1206, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1200 includes one or more ports, such as an input/output (I/O) port 1208 and a communication port 1210, for communicating with other computing, network, or vehicle devices. It will be appreciated that the ports 1208-1210 may be combined or separate and that more or fewer ports may be included in the computer system 1200.

The I/O port 1208 may be connected to an I/O device, or other device, by which information is input to or output from the computing system 1200. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1200 via the I/O port 1208. Similarly, the output devices may convert electrical signals received from computing system 1200 via the I/O port 1208 into signals that may be sensed as output by a human, such as sound, light, and/or touch. The input device may be an alphanumeric input device, including alphanumeric and other keys for communicating information and/or command selections to the processor 1202 via the I/O port 1208. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1200 via the I/O port 1208. For example, an electrical signal generated within the computing system 1200 may be converted to another type of signal, and/or vice-versa. In one implementation, the environment transducer devices sense characteristics or aspects of an environment local to or remote from the computing device 1200, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1200, such as, physical movement of some object (e.g., a mechanical actuator), heating or cooling of a substance, adding a chemical substance, and/or the like.

In one implementation, a communication port 1210 is connected to a network by way of which the computer system 1200 may receive network data useful in executing the methods and systems set out herein as well as transmitting information and network configuration changes determined thereby. Stated differently, the communication port 1210 connects the computer system 1200 to one or more communication interface devices configured to transmit and/or receive information between the computing system 1200 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1210 to communicate one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network, or over another communication means. Further, the communication port 1210 may communicate with an antenna or other link for electromagnetic signal transmission and/or reception.

In an example implementation, radial logs, axial logs, impedance information, spectra, characterizations, and software and other modules and services may be embodied by instructions stored on the data storage devices 1204 and/or the memory devices 1206 and executed by the processor 1202.

The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for isolation detection in a wellbore, the method comprising:
   obtaining recorded data including radial acoustic waves transmitted and received using a radial sensor of an acoustic logging tool deployed in the wellbore;
   separating a first set of waves of the radial acoustic waves from a second set of waves of the radial acoustic waves by converting the recorded data from a time domain to a frequency domain, the first set of waves corresponding to a first direction of radial propagation and the second set of waves corresponding to a second direction of radial propagation;
   shifting the first set of waves into a first set of shifted waves and the second set of waves into a second set of shifted waves;
   generating a forward wave by combining the first set of shifted waves and a reflected wave by combining the second set of shifted waves; and
   identifying one or more isolation regions in the wellbore using the forward wave and the reflected wave.

2. The method of claim 1, wherein the radial acoustic waves are transmitted and received by the radial sensor using a plurality of staves.

3. The method of claim 2, wherein each transmission by one of the plurality of staves is received by all of the plurality of staves.

4. The method of claim 2, wherein each transmission of the plurality of staves is a chirp pulse.

5. The method of claim 1, wherein each of the one or more isolation regions corresponds to an area of bonded cement free from anomalies and adapted for plug and abandon of the wellbore.

6. The method of claim 1, wherein the first direction is clockwise and the second direction is counterclockwise.

7. The method of claim 1, wherein the recorded data is converted from the time domain to the frequency domain using a Fourier transform.

8. The method of claim 1, wherein the forward wave is transmitted with time delays to define an angular velocity.

9. The method of claim 1, wherein at least a portion of the forward spectrum of the forward wave characterizes eccentricity.

10. The method of claim 1, wherein at least a portion of the reflected spectrum of the reflected wave characterizes at least one of anomaly presence or material type.

11. The method of claim 1, wherein the one or more isolation regions correspond to areas having radial symmetry.

12. One or more tangible non-transitory computer-readable storage media storing computer-executable instructions for performing a computer process on a computing system, the computer process comprising:
   obtaining recorded data including radial acoustic waves transmitted and received using a radial sensor of an acoustic logging tool deployed in the subterranean region;
   reconstructing at least one of a forward wave or a reflected wave based on the radial acoustic waves; and
   determining one or more characteristics of at least a portion of a structure in the subterranean region based on at least one of the forward wave or the reflected wave, the one or more characteristics including one or more isolation regions corresponding to an area of bonded cement free from anomalies and adapted for plug and abandon of a wellbore of the subterranean region.

13. The one or more tangible non-transitory computer-readable storage media of claim 12, further comprising:
   separating a first set of waves of the radial acoustic waves from a second set of waves of the radial acoustic waves by converting the recorded data from a time domain to a frequency domain, the first set of waves corresponding to a first direction of radial propagation and the second set of waves corresponding to a second direction of radial propagation.

14. The one or more tangible non-transitory computer-readable storage media of claim 13, further comprising:
   shifting the first set of waves into a first set of shifted waves, the forward wave being reconstructed by combining the first set of shifted waves.

15. The one or more tangible non-transitory computer-readable storage media of claim 13, further comprising:
   shifting the second set of waves into a second set of shifted waves, the reflected wave being reconstructed by combining the second set of shifted waves.

16. The one or more tangible non-transitory computer-readable storage media of claim 12, wherein the structure includes one or more of a casing, a production tube, and cement.

17. The one or more tangible non-transitory computer-readable storage media of claim 12, wherein the one or more characteristics include one or more of a structure containment integrity, an identification of material, a bonding integrity, a bonding connection, and a presence of an anomaly.

18. The one or more tangible non-transitory computer-readable storage media of claim 12, wherein the one or more characteristics includes an identification of one or more isolation regions in the subterranean region associated with the structure.

19. A system for isolation detection, the system comprising:
 a plurality of staves arranged about a circumference of a radial acoustic sensor;
 a plurality of plates wired in parallel, the plurality of plates forming one of the plurality of staves, the plurality of plates tapering in size longitudinally along a length of the radial acoustic sensor, such that the plurality of plates are longer in a middle of the radial acoustic sensor and shorter at ends of the radial acoustic sensor, the radial acoustic sensor transmitting and receiving radial acoustic waves using the plurality of staves.

20. The system of claim 19, wherein each transmission by one of the plurality of staves is received by all of the plurality of staves.

21. The system of claim 19, wherein each transmission of the plurality of staves is a chirp pulse.

22. The system of claim 19, wherein the plurality of plates form a truncated hanning window based on the tapering in size.

* * * * *